United States Patent
Nelson et al.

[19]

[11] Patent Number: 6,139,005
[45] Date of Patent: Oct. 31, 2000

[54] FILM SUPPLY SYSTEM FOR USE WITH A PHOTOSENSITIVE FILM IMAGER

[75] Inventors: Brian D. Nelson, Birchwood; James R. Gilbertson, Maplewood; Robert J. Mattila, Woodbury; John J. Allen, Mendota Heights, all of Minn.

[73] Assignee: Eastman Kodak Company, Rochester, N.Y.

[21] Appl. No.: 08/939,510

[22] Filed: Sep. 29, 1997

[51] Int. Cl.7 ..................................................... B65H 3/08
[52] U.S. Cl. ............................................. 271/90; 271/124
[58] Field of Search ................................ 271/90, 91, 124

[56] References Cited

U.S. PATENT DOCUMENTS

| | | | |
|---|---|---|---|
| 3,866,764 | 2/1975 | Leiser | 271/91 |
| 4,351,518 | 9/1982 | Stievenart | 271/90 |
| 4,585,222 | 4/1986 | Nishibori et al. | 271/106 |
| 4,848,764 | 7/1989 | Tajima et al. | 271/90 |
| 4,853,724 | 8/1989 | Tajima et al. | 354/277 |
| 5,127,646 | 7/1992 | Matsuda et al. | 271/171 |
| 5,154,406 | 10/1992 | Bauer | 271/90 X |
| 5,350,166 | 9/1994 | Shizuma et al. | 271/91 X |
| 5,653,433 | 8/1997 | Ishizuka | 271/124 X |
| 5,660,384 | 8/1997 | Kovach et al. | 271/145 |
| 5,879,003 | 3/1999 | Kovach et al. | 271/121 |

FOREIGN PATENT DOCUMENTS

| | | | |
|---|---|---|---|
| WO 92/09512 | 6/1992 | WIPO | B65H 3/08 |
| WO 95/30934 | 11/1995 | WIPO | G03D 13/00 |
| WO 96/16353 | 5/1996 | WIPO | G03B 42/04 |

*Primary Examiner*—William E. Terrell
*Assistant Examiner*—Gene O. Crawford
*Attorney, Agent, or Firm*—William F. Noval

[57] ABSTRACT

A film supply system for use within a photosensitive film imager. The film supply system includes a cartridge receiving apparatus and a film pick-up mechanism. The cartridge receiving apparatus includes a tray, a guide frame and an elevator mechanism. The guide frame is configured to be disposed within an imager housing. The tray includes a floor and extending walls for maintaining a film cartridge and is pivotably received by the guide frame. The tray further defines a cartridge insertion passage and moves between an elevated position and a retracted position relative to the guide frame. In the elevated position, the cartridge insertion passage is normal to a film travel path of the imager. Finally, the elevator mechanism is disposed within the imager housing and drives the tray between the elevated position and the retracted position. The film pick-up mechanism includes a retention frame, a drive frame, a drive means, a heel plate, and a cup plate. The retention frame is configured for selective attachment within the imager housing and slidably receives the drive frame. The drive frame is driven by the drive means between an extended position and a retracted position and is attached to the heel plate opposite the retention frame. The cup plate includes a suction cup and is pivotably attached to the heel plate.

35 Claims, 31 Drawing Sheets

FILM SUPPLY SYSTEM FOR USE WITH A PHOTOSENSITIVE FILM IMAGER

BACKGROUND OF THE INVENTION

The present invention relates to a system for maintaining and distributing sheets of photosensitive film within a laser imager. More particularly, it relates to a system configured to receive and open a cartridge of photosensitive film within an imager, and separate and deliver individual sheets of photosensitive film from the cartridge to a film transport system of the imager.

Light sensitive, photothermographic film is used in many applications ranging from a standard photocopying apparatus, to graphic arts and/or medical imaging/recording printing systems. For example, in the medical industry, laser imaging systems employing photothermographic film are commonly used to produce photographic images from digital image data generated by magnetic resonance (MR), computer tomography (CT) or other types of scanners. Systems of this type typically include a laser imager for exposing an image on the photothermographic film, a thermofilm processor for developing the film through the application of heat, and an image management subsystem for coordinating the operation of the laser imager and the thermofilm processor. The resulting image is available for diagnostic use by medical radiologists and communications to referring physicians and their patients.

Generally speaking, a photosensitive film laser imager includes a film supply system, a film exposure assembly, a film processing station (or developer), a film dispensing area and a film transport system. Each of these components are associated within a relatively large imager housing.

Sheets of unexposed photosensitive film is normally stacked in a sealed, standardized film cartridge, for delivery to the imager. The standard film cartridge includes 125 sheets of film and is sealed by a foil cover. During use, the film cartridge is inserted into the film supply system of the imager. The film supply system normally includes mechanisms for unsealing the film cartridge and subsequently removing individual sheets of film. In this regard, the film supply system separates and delivers an individual sheet of photosensitive film from the film cartridge to the film transport system. The film transport system, in turn, delivers the individual sheet of film to the film exposure assembly. Within the film exposure assembly, photographic images are exposed on the film from image data (e.g., digital or analog) using a laser imager. The exposed sheet of film is then transported, via the film transport system, to the film processing station where the film is developed. After thermal processing, the film is cooled and transported to the film dispensing area where the final image is available to the user.

While the above-described laser imager has proven to be highly successful, several potential drawbacks may exist. For example, the film supply system is normally very complex, and therefore expensive. The film supply system is generally configured to define a film cartridge insertion path which is approximately in the direction of the plane generated by the path in which individual sheets of film are removed from the cartridge within the imager housing. In other words, the film cartridge is inserted, either horizontally or vertically, into the imager housing in the same direction that the sheets of film are subsequently removed from the film cartridge. However, when a film jam invariably occurs, film jam removal requires user access to the film supply system from a plane normal to the film path. Thus, the imager housing must provide user access from at least two sides of the machine, thereby increasing costs. Additionally, the film cartridge is normally maintained by the film supply system in a horizontal, rather than angled, position. This horizontal positioning requires an enlarged, and therefore more expensive, housing to accommodate a full length of the film cartridge.

In addition to the concerns associated with film cartridge positioning, a standard film supply system also generally includes an intricate, multi-component mechanism for separating and delivering individual sheets of film to the film transport system. The film supply system must be designed to ensure that only a single sheet of photosensitive film is delivered to the film transport system. In particular, it is understood that an interface force develops between sheets of photosensitive film otherwise stored within a sealed cartridge. The interface force can include static charge, edge burrs, and suction forces, and causes two or more sheets of photosensitive film to stick to one another. Obviously, a system error may result if more than a single sheet of film is mistakenly forwarded to the film exposure assembly. Thus, the film supply system must be designed to consistently separate individual sheets of film from one another.

To accomplish desired film separation, the standard film supply system normally includes several mechanisms and a number of independently driven parts which maneuver the film sheet in different directions to effectuate film separation. This complex approach to separating and delivering sheets of film is normally quite expensive.

The known laser imager provides a device able to rapidly and consistently produce laser images of high quality. However, the design of the film supply system within the imager, including cartridge insertion and film pick-up, is complex and relatively expensive. Therefore, a substantial need exists for a film supply system configured to meet the design and operational constraints of a photosensitive film laser imager, in a cost-effective manner.

SUMMARY OF THE INVENTION

The present invention provides a film supply system for use with a laser imager. In one preferred embodiment, the film supply system includes a cartridge receiving apparatus associated with a film pick-up mechanism. The cartridge receiving apparatus is preferably configured to receive and maintain a cartridge of photosensitive film. The film pick-up mechanism, in turn, is associated with the cartridge receiving apparatus and is preferably configured to separate and deliver individual sheets of photosensitive film from the film cartridge to a film transport system.

In one preferred embodiment, the film pick-up mechanism includes a retention frame, a drive frame, a drive means, a heel plate and a cup plate. The retention frame is configured for attachment within the imager and slidably receives the drive frame. In this regard, the drive means is configured to maneuver the drive frame relative to the retention frame. The heel plate extends from the drive frame opposite the retention frame. The cup plate includes a pivot arm, a suction cup and a pick-up drive arm and is pivotably attached to the heel plate at the pivot arm. The suction cup is preferably configured to selectively engage a sheet of photosensitive film. The pick-up drive arm is configured to direct movement of the cup plate.

In one preferred embodiment, the drive means of the film pick-up mechanism is configured to move the drive frame from a first, raised position relative to the retention frame to a second, lowered position relative to the retention frame in a downward stroke; and from the lowered position to the raised position in an upward stroke. During use, after a cartridge of photosensitive film has been placed into the cartridge receiving apparatus and opened, the film pick-up mechanism is operated to retrieve a top sheet of photosensitive film from the film cartridge. In this regard, the drive means performs the downward stroke to translate the drive frame from the raised position to the lowered position. In the lowered position, the heel plate contacts the top sheet of film. Continued movement of the drive frame in the downward stroke in combination with directional force of the pick-up drive arm causes the cup plate to pivot relative to the heel plate at the pivot arm. This pivoting motion is continued until the suction cup engages the top sheet of photosensitive film. In a preferred embodiment, a passive vacuum is created between the suction cup and the top sheet of photosensitive film. The drive plate is then translated through the upward stroke, imparting a bend in a portion of the top sheet of film. This bend overcomes an interface force between the top sheet of film and other sheets of film, separating the top sheet of film. Continued movement of the drive plate in the upward stroke transfers a leading edge of the top sheet of film to a film transport system.

In one alternative embodiment, the film pick-up mechanism includes a separation tab associated with the cartridge receiving apparatus to assist in separating sheets of photosensitive film.

In another preferred embodiment, the cartridge receiving apparatus includes a tray, a guide frame and an elevator mechanism. The tray is configured to receive a film cartridge and includes a floor and extending walls defining a cartridge insertion passage. The guide frame selectively maintains the tray and guides movement of the tray between a retracted position and an extended position. In this regard, the guide frame is configured such that in the extended position, the cartridge insertion passage is normal to a film travel path of the laser imager. Further, in one preferred embodiment, at the lowered position, the floor of the tray is positioned at an angle relative to a horizontal plane. Finally, the elevator mechanism is associated with the tray to translate the tray between the retracted position and the extended position.

Use of the cartridge receiving apparatus includes activating the elevator mechanism to position the tray in the extended position relative to the guide frame. A user then inserts a photosensitive film cartridge into the tray via the cartridge insertion passage. The elevator mechanism is activated to translate the tray to the retracted position relative to the guide frame. In the retracted position, the film cartridge is properly oriented to interact with the film pick-up mechanism. In one preferred embodiment, the guide frame includes locators sized to extend through the tray to receive and maintain the film cartridge. In an alternative embodiment, the cartridge receiving apparatus further includes a rollback mechanism for engaging and opening a cover of the film cartridge. To this end, the guide frame and the elevator mechanism are configured to allow movement of the rollback mechanism.

BRIEF DESCRIPTION OF THE DRAWINGS

The accompanying drawings are included to provide a further understanding of the present invention and are incorporated and constitute a part of the specification. The drawings illustrate the exemplary embodiments of the present invention and together with the description, serves to explain the principles of the invention. Other objects of the present invention, and many of the attendant advantages of the present invention, will be readily appreciated as the same becomes better understood by reference to the following detailed description, when considered in connection with the accompanying drawings, in which like reference numerals designate like or similar parts throughout the drawing figures, and wherein.

DETAILED DESCRIPTION OF THE INVENTION

A. Laser Imaging System 30 Overview

Figure 1:
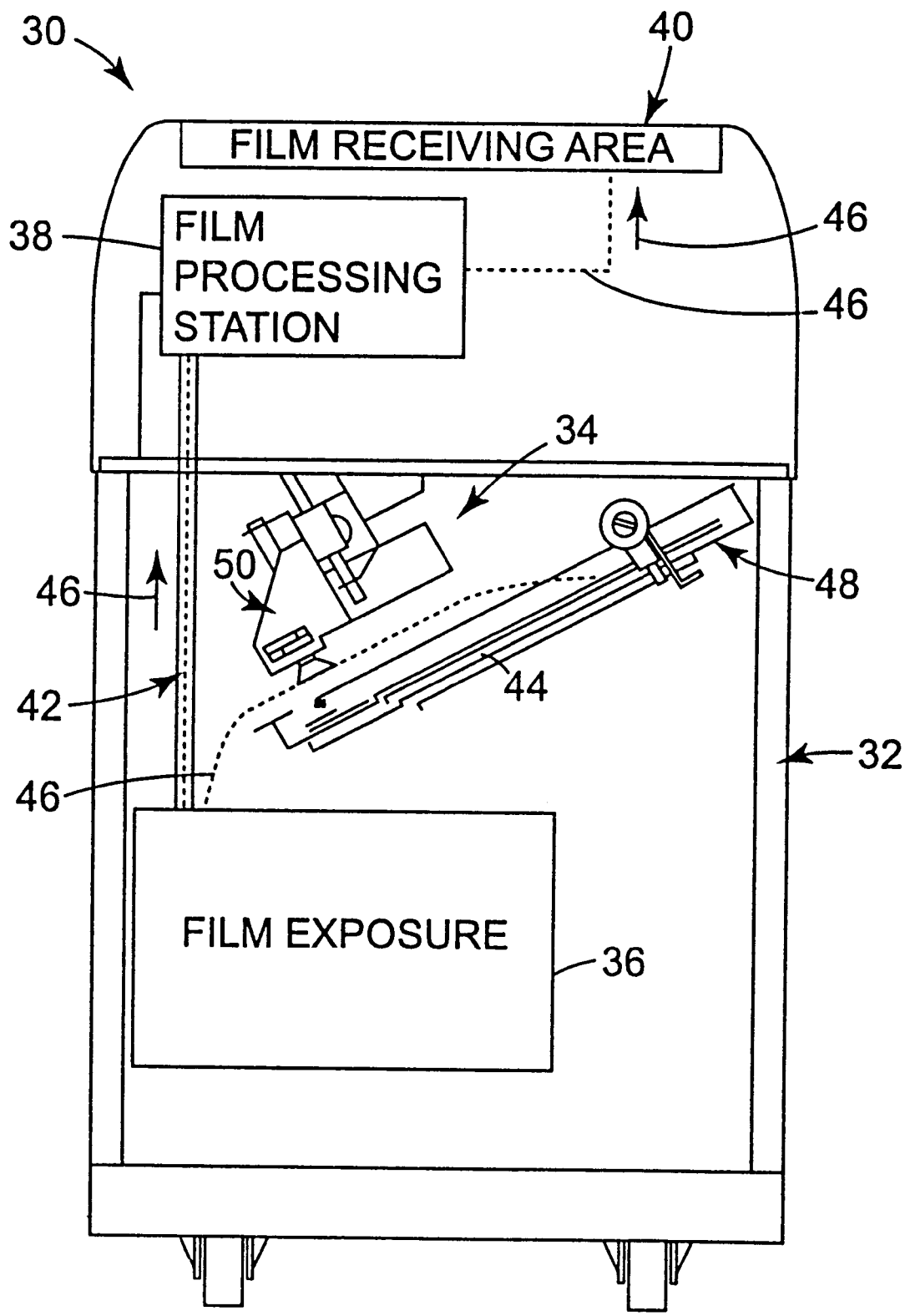
FIG. 1 is a front view of a laser imager having a film supply system in accordance with the present invention.

FIG. 1 shows a front view of a laser imaging system 30 incorporating a film supply system of the present invention. The laser imaging system 30 generally includes an imager housing 32, a film supply system 34, a film exposure assembly 36, a film processing station 38, a film exit area 40 and a film transport system 42. It should be understood that each of the components of the laser imaging system 30 are shown generally in FIG. 1. Further details on the laser imaging system 30, and in particular the film supply system 34, are described in greater detail below.

The film supply system 34, the film exposure assembly 36, the film processing station 38, the film exit area 40 and the film transport system 42 are all disposed at various locations within the imager housing 32. During use, a cartridge of photosensitive film 44 is placed within the film supply system 34. Upon activation, the film supply system 34 retrieves a single sheet of photosensitive film (not shown). The sheet of photosensitive film is delivered by the film supply system 34 to the film transport system 42 for delivery to the film exposure assembly 36. Within the film exposure assembly 36, photographic images are exposed on the film from image data (e.g., digital or analog), using a laser imager. The thusly exposed film is then transported via the film transport system 42 to the film processing station 38 where the film is developed. After thermal processing, the film is cooled and transported via the film transport system 42 to the film exit area 40. For ease of illustration, the film travel path is represented by dashed lines 46.

As described in greater detail below, the film supply system 34 includes a cartridge receiving apparatus 48 and a film pick-up mechanism 50. As shown in FIG. 1, the cartridge receiving apparatus 48 and the film pick-up mechanism 50 are configured such that the film cartridge 44 is orientated at an angle so as to reduce the overall size of the imager housing 32. More particularly, unlike other imaging system designs, the cartridge receiving apparatus 48 is not horizontal, so that the overall width of the imager housing 32 can be reduced. The film pickup mechanism 50, as shown in FIG. 1, is also orientated at an angle to accommodate desired positioning of the cartridge receiving apparatus 48. As will be made more clear below, the film pick-up mechanism 50 is preferably normal to film within the film cartridge 44 to prevent film scuffing or other damage upon retrieval of the film by the film pick-up mechanism 50.

An additional feature of the present invention generally shown in FIG. 1 is that access to the imager housing 32 need only be provided at one side. More particularly, the film cartridge 44 is inserted into the cartridge receiving apparatus 48 in a plane normal to the film travel path 46. Correction of potential film jams within the imager housing 32 requires user access in this same direction. Thus, only a single access point or door is required in the imager housing 32.

B. Cartridge Receiving Apparatus 48

Figure 2:
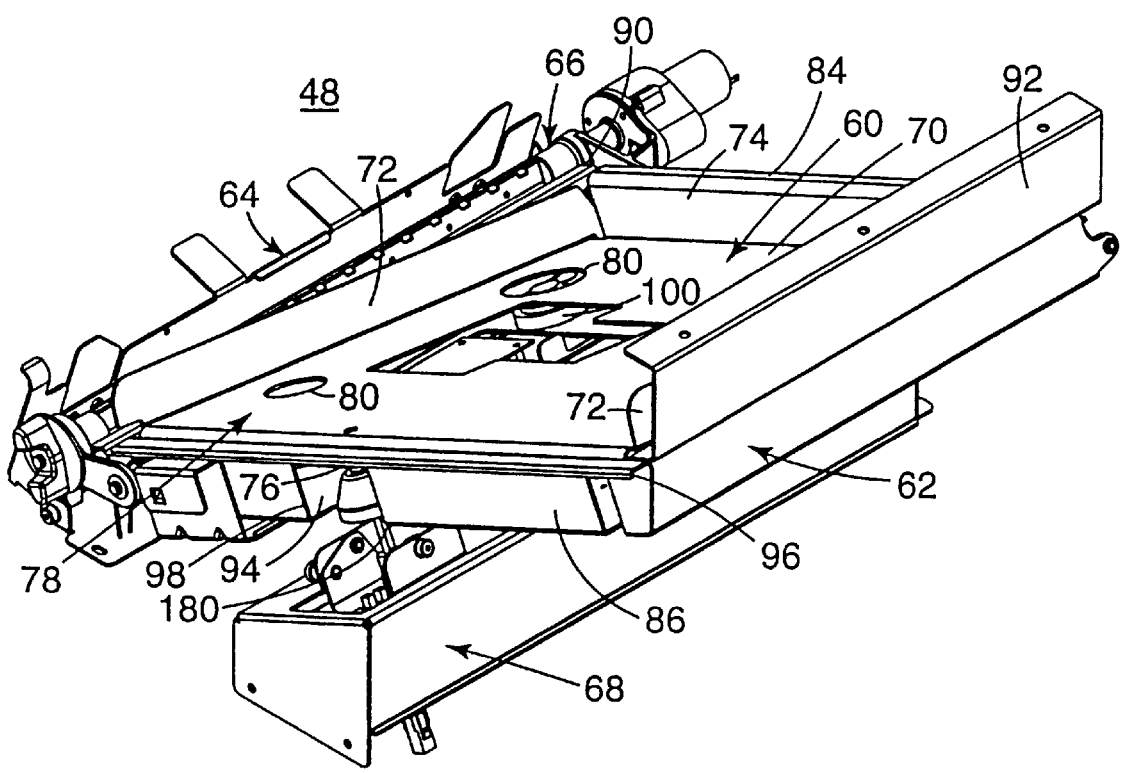
FIG. 2 is a front perspective view of a cartridge receiving apparatus of the film supply system in an extended position in accordance with the present invention.

FIG. 2 shows a preferred embodiment of the cartridge receiving apparatus 48. Notably, for ease of illustration, the cartridge receiving apparatus 48 is shown separate from the remainder of the laser imager 30 (FIG. 1).

The cartridge receiving apparatus 48 includes a tray 60, a guide frame 62, a film guard 64, a rollback mechanism 66 and an elevator mechanism 68. The guide frame 62 and the elevator mechanism 68 are configured to be secured within the imager housing 32 (FIG. 1). The film guard 64 and the rollback mechanism 66 are selectively secured to the guide frame 62. The tray 60 is pivotably positioned within the guide frame 62. In this regard, the elevator mechanism 68 controls placement of the tray 60 relative to the guide frame 62. More particularly, the elevator mechanism 68 maneuvers the tray 60 relative to the guide frame 62 between a raised position (FIG. 2) and a lowered position.

The tray 60 includes a floor 70, end walls 72, a side wall 74 and a socket 76. The floor 70 is preferably sized to maintain the film cartridge 44 (FIG. 1). The end walls 72 and the side wall 74 extend upwardly from the floor 70 to maintain the film cartridge 44 relative to the floor 70. As shown in FIG. 2, the end walls 72 and the side wall 74 define a cartridge insertion path 78 through which the film cartridge 44 is slid into engagement with the tray 60. In other words, the tray 60 is configured to direct insertion of the film cartridge 44 from a side opposite the side wall 74.

Figure 3:
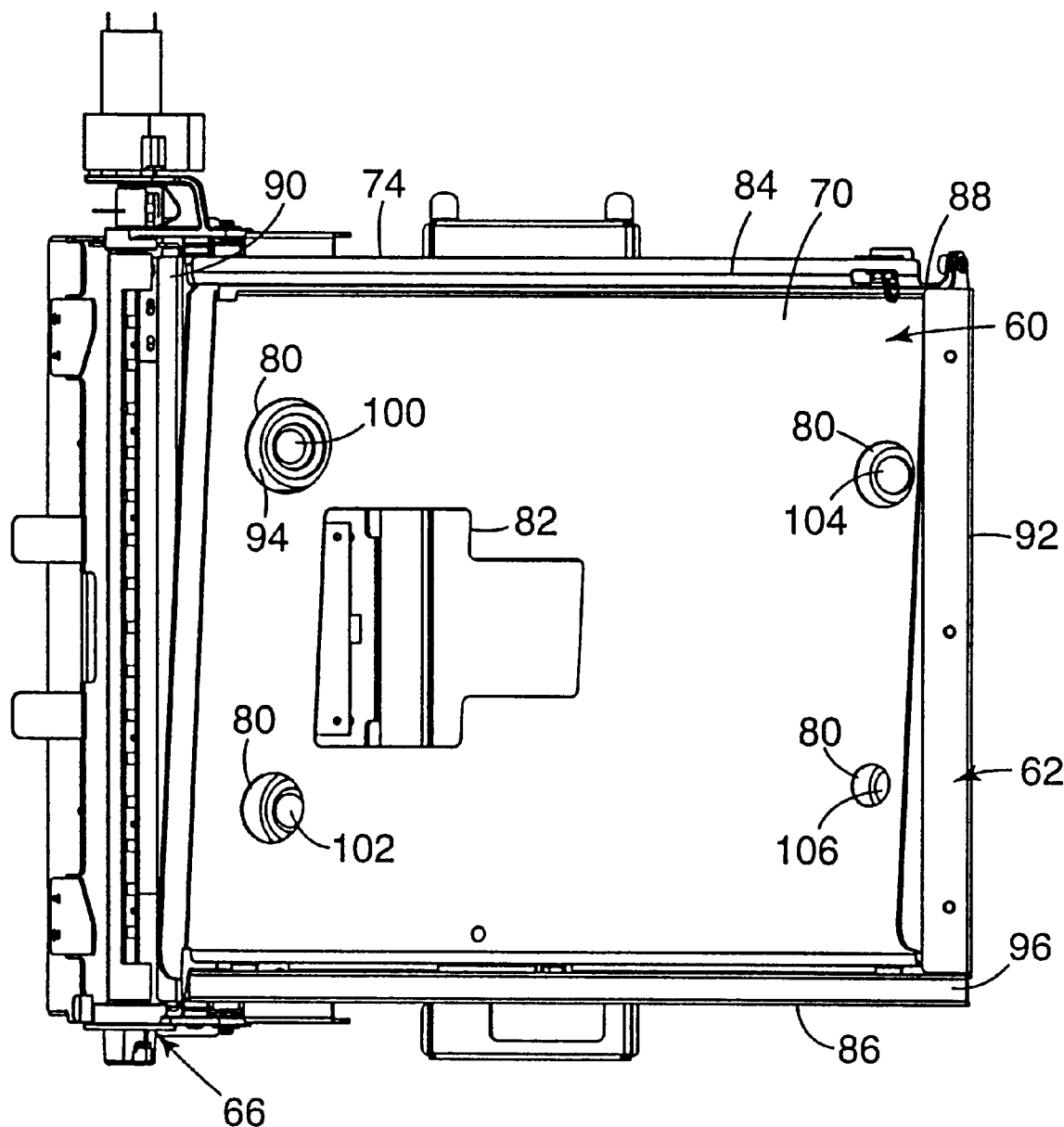
FIG. 3 is a top perspective view of the cartridge receiving apparatus of FIG. 2 in accordance with the present invention.

As shown in FIG. 3, the floor 70 of the tray 60 preferably includes a plurality of locator holes 80 and a bar code opening 82. As described in greater detail below, the locator holes 80 are sized and positioned in the floor 70 to allow passage of locators (described below) of the guide frame 62, which otherwise facilitate proper positioning of the film cartridge 44 (FIG. 1) on the tray 60. The bar code opening 82 is preferably sized to accommodate reading of a bar code otherwise disposed on a bottom of the film cartridge 44. Generally speaking, the film cartridge 44 normally includes a bar code identification on a bottom thereof. The bar code opening 82 is sized such that the bar code on the film cartridge 44 is accessible by a portion of the rollback mechanism 66.

The side wall 74 extends upwardly from the floor 70 and includes a shoulder 84. The shoulder 84 is configured to be pivotably attached to the guide frame 62. Thus, the shoulder 84 defines a tray pivot point along which the tray 60 is maneuverable, via the elevator mechanism 68, between the raised position and the lowered position.

Figure 4:
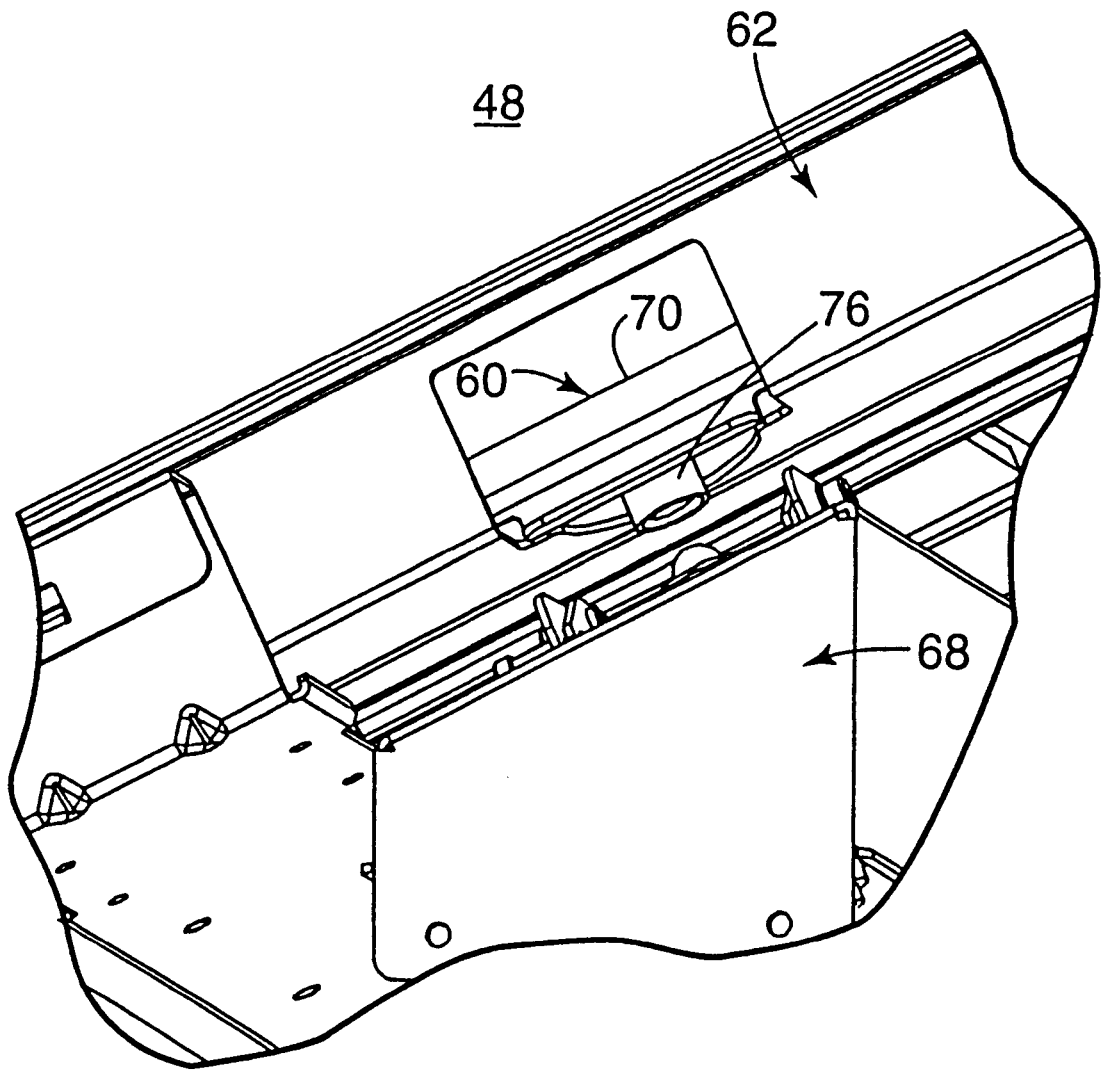
FIG. 4 is an enlarged perspective view of a portion of the cartridge receiving apparatus of FIG. 2 in accordance with the present invention.

The socket 76 is shown best in FIG. 4 as extending from a lower surface of the floor 70. Notably, to better illustrate the socket 76, the tray 60 is shown in the lowered position in FIG. 4. The socket 76 is configured to mate with a portion of the elevator mechanism 68, as described in greater detail below. In a preferred embodiment, the socket 76 is positioned adjacent a leading edge of the floor 70. In other words, the socket 76 extends from the floor 70 opposite the side wall 74 (FIG. 2). Alternatively, the socket 76 can be positioned at other locations along the floor 70 so long as engagement with the elevator mechanism 68 is accomplished. Even further, the socket 76 can be replaced by other configurations designed to selectively receive a portion of the elevator mechanism 68.

In a preferred embodiment, the tray 60 is formed of a rigid material, such as sheet metal. The tray 60 is preferably a singular body, with the end walls 72 and the side wall 74 formed by a bending process. Alternatively, the end walls 72 and the side wall 74 can be welded or otherwise attached to the floor 70. Similarly, the socket 76 is welded or otherwise attached to the floor 70.

Returning to FIGS. 2 and 3, the guide frame 62 approximates an open compartment and includes first and second side walls 86, 88, first and second end walls 90, 92 and a bottom 94. The first and second side walls 86, 88 and the first and second end walls 90, 92 extend upwardly from opposite sides of the bottom 94, respectively. The first and second side walls 86, 88 each include a lip 96 along an upper edge thereof. Further, as shown in FIG. 2, an elevator head passage 98 is defined by the bottom 94 and the first side wall 86. The elevator head passage 98 is preferably sized to allow passage of a portion of the elevator mechanism 68 into and out of contact with the socket 76 of the tray 60.

The bottom 94 includes first and second aperture locators 100, 102, and first and second support locators 104, 106, best shown in FIG. 3. The aperture locators 100, 102 are preferably tapered at a leading end and extend from the bottom 94 at positions configured to interact with reciprocal apertures (not shown) on a bottom of the film cartridge 44 (FIG. 1). Similarly, the first and second support locators 104, 106 extend from the bottom 94 at positions configured to abut reciprocal supports (not shown) on a bottom of the film cartridge 44. In other words, a standard film cartridge normally includes two apertures and two supports formed at a bottom of the film cartridge 44. The aperture locators 100, 102 are appropriately sized to nest within the apertures, whereas the support locators 104, 106 abut the supports. In this regard, the locators 100–106 preferably extend from the bottom 94 of the guide frame 62 to a height greater than a thickness of the floor 70 of the tray 60. Thus, when the floor 70 of the tray 60 is pivoted to rest on top of the bottom 94 of the guide frame 62, the locators 100–106 extend through the respective locator holes 80 and engage the apertures and supports (not shown) of the film cartridge 44 (FIG. 1).

Figure 5:
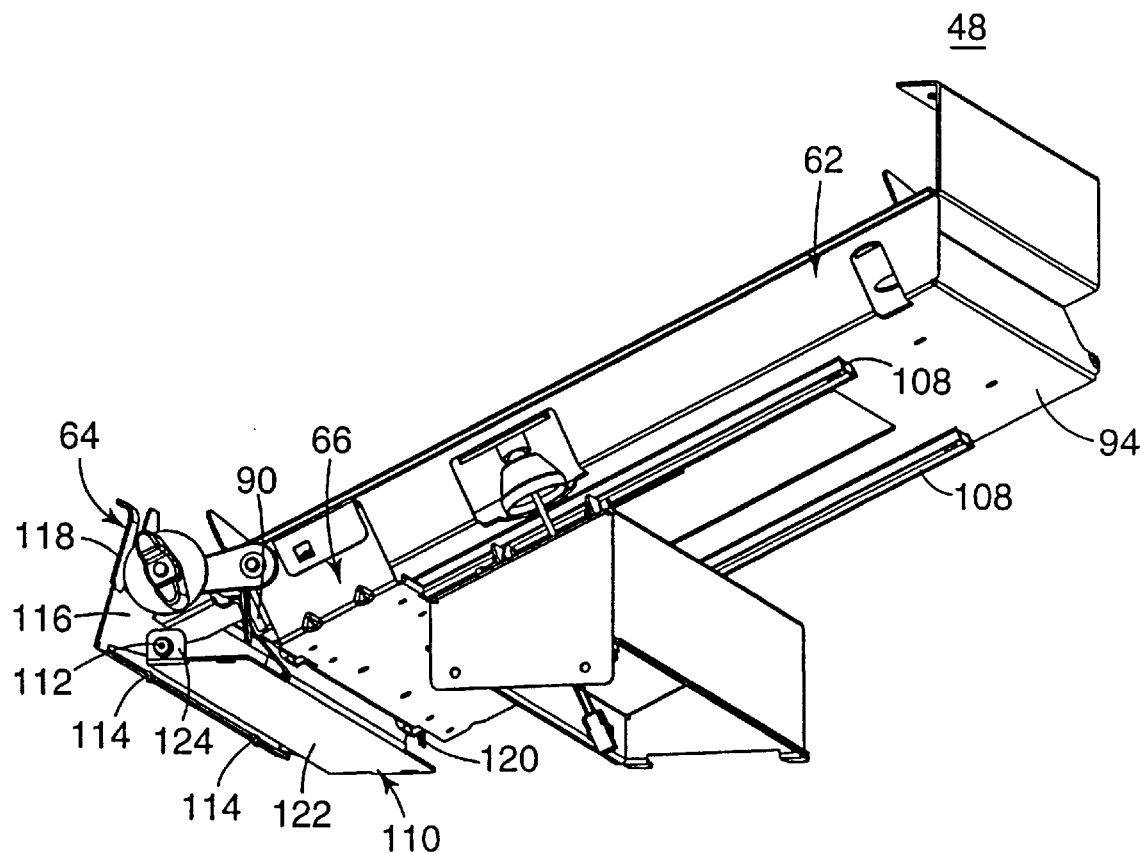
FIG. 5 is a bottom perspective view of the cartridge receiving apparatus of FIG. 2 in accordance with the present invention.

As shown in FIG. 5, the bottom 94 of the guide frame 62 further includes rollback slides 108. The rollback slides 108 extend from a lower surface of the bottom 94 and are configured to selectively receive and maintain the rollback mechanism 66. More particularly, the rollback slides 108 facilitate translation of the rollback mechanism 66 relative to the guide frame 62, as described in more detail below.

In a preferred embodiment, the guide frame 62 is made from a rigid material such as sheet metal. Standard sheet metal manufacturing techniques can be employed to form the bottom 94, the side walls 86, 88 and the end walls 90, 92. Additionally, the lip 96 and the elevator head passage 98 can also be formed via sheet metal manufacturing techniques. Finally, the locators 100–106 are preferably made of a plastic material and are attached to the bottom 94 by screws. Alternatively, other forms of attachment, such a welding or an adhesive, may also be useful.

Figure 6:
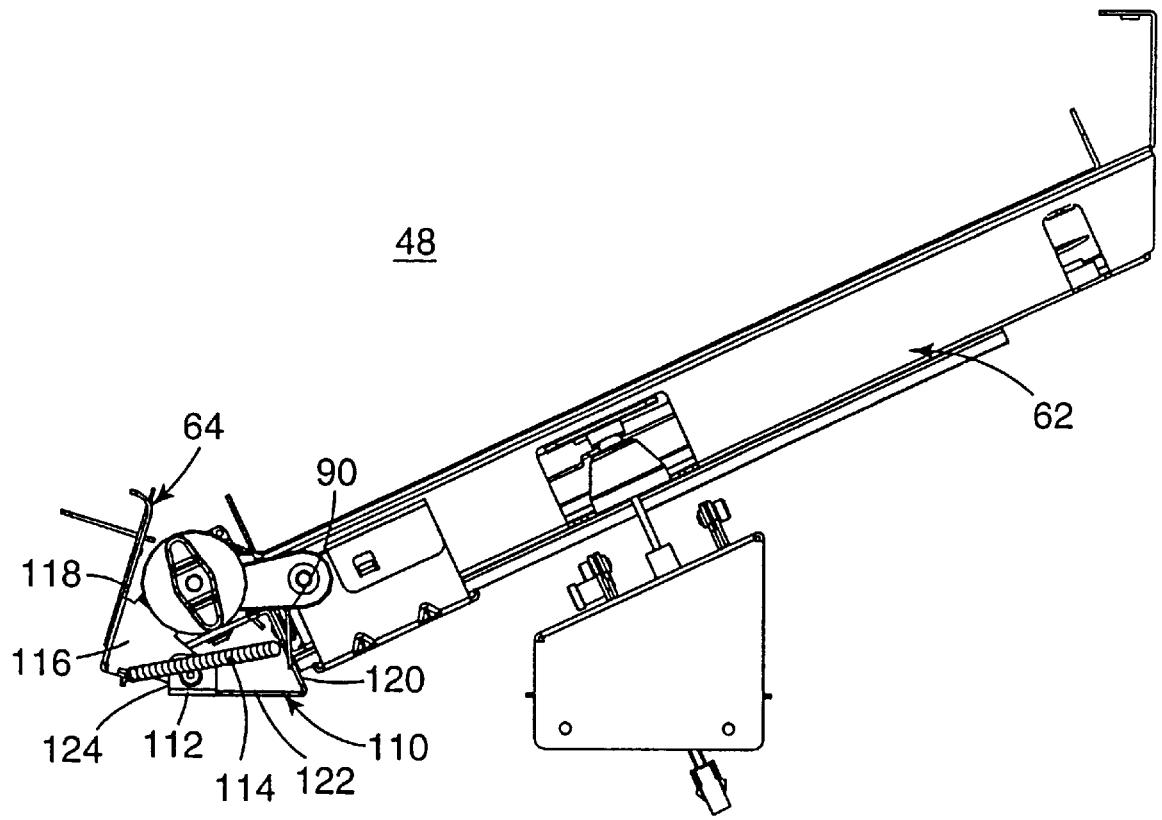
FIG. 6 is a front view of the cartridge receiving apparatus of FIG. 2 in accordance with the present invention.

As shown in FIGS. 5 and 6, the film guard 64 includes a guard attachment frame 110, a pivot 112, biasing means 114, a lever arm 116 and a cover plate 118. The guard attachment frame 110 is attached to the guide frame 62 and to the lever arm 116 at the pivot 112. The cover plate 118 is attached to, and extends perpendicularly from, the lever arm 116. Finally, the biasing means 114 biases the cover plate 118 toward the guard attachment frame 110 about the pivot 112.

As best shown in FIG. 6, the guard attachment frame 110 is an approximately L-shaped body including a shoulder 120, an extension plate 122 and tabs 124. The shoulder 120, the extension plate 122 and the tabs 124 are preferably formed as a singular body. Further, the tabs 124 are disposed at opposite sides of the extension plate 122. While only one of the tabs 124 is shown in FIG. 6, it should be understood that a second one of the tabs 124 is disposed at an opposite side of the extension plate 122.

The shoulder 120 is preferably configured for attachment to the first end wall 90 of the guide frame 62. The extension plate 122 extends from the shoulder 120 in an angular fashion, and is configured to retain a portion of the biasing means 114. In a preferred embodiment, the shoulder 120 and the extension plate 122 are sized to extend along the entire length of the first end wall 90 of the guide frame 62. Finally, the tabs 124 extend from the extension plate 122 and are configured to receive a portion of the pivot 112. In a preferred embodiment, the guard attachment frame 110 is an integral body, formed from a rigid material, such as stainless steel. However, other materials, such as reinforced plastic, may also be useful.

The hinge 112 is configured to provide pivoting attachment between the guard attachment frame 110 and the lever arm 116. In this regard, the pivot 112 preferably includes two shoulder bolts, each configured to connect the lever arm 116 to one of the tabs 124 of the guard attachment frame 110. Alternatively, the pivot 112 can assume other forms sufficient to provide pivotable attachment between the guard attachment frame 110 and the lever arm 116.

The biasing means 114 is configured to bias the cover plate 118 toward the guard attachment frame 110 and is preferably two extension springs, disposed at opposite sides of the guard attachment frame 110 as shown in FIG. 5. Notably, portions of the biasing means 114 are hidden in FIGS. 5 and 6. With this preferred design, each of the two extension springs are attached at opposite ends to the shoulder 120 of the guard attachment frame 110 and the cover plate 118, respectively. In this regard, the shoulder 120 and the cover plate 118 may include clips to receive the springs 114. While the biasing means 114 is preferably in the form of two extension springs, other forms, such as a mechanical hinge positioned on an exterior of the guard attachment frame 110 and the lever arm 116, may also be useful.

The lever arm 116 is preferably a singular body extending from the pivot 112, having a length approximating that of the extension plate 122. Further, the lever arm 116 terminates at opposite ends with an opening sized to receive a portion of the pivot 112. As shown in FIGS. 5 and 6, then, the lever arm 116 is sized to abut an interior portion of the tabs 124 of the guard attachment frame 110 such that openings in the two components are aligned. Finally, the lever arm 116 is configured for attachment to a portion of the biasing means 114. In the preferred embodiment, the lever arm 116 is made of a rigid material such as steel.

Figure 7:
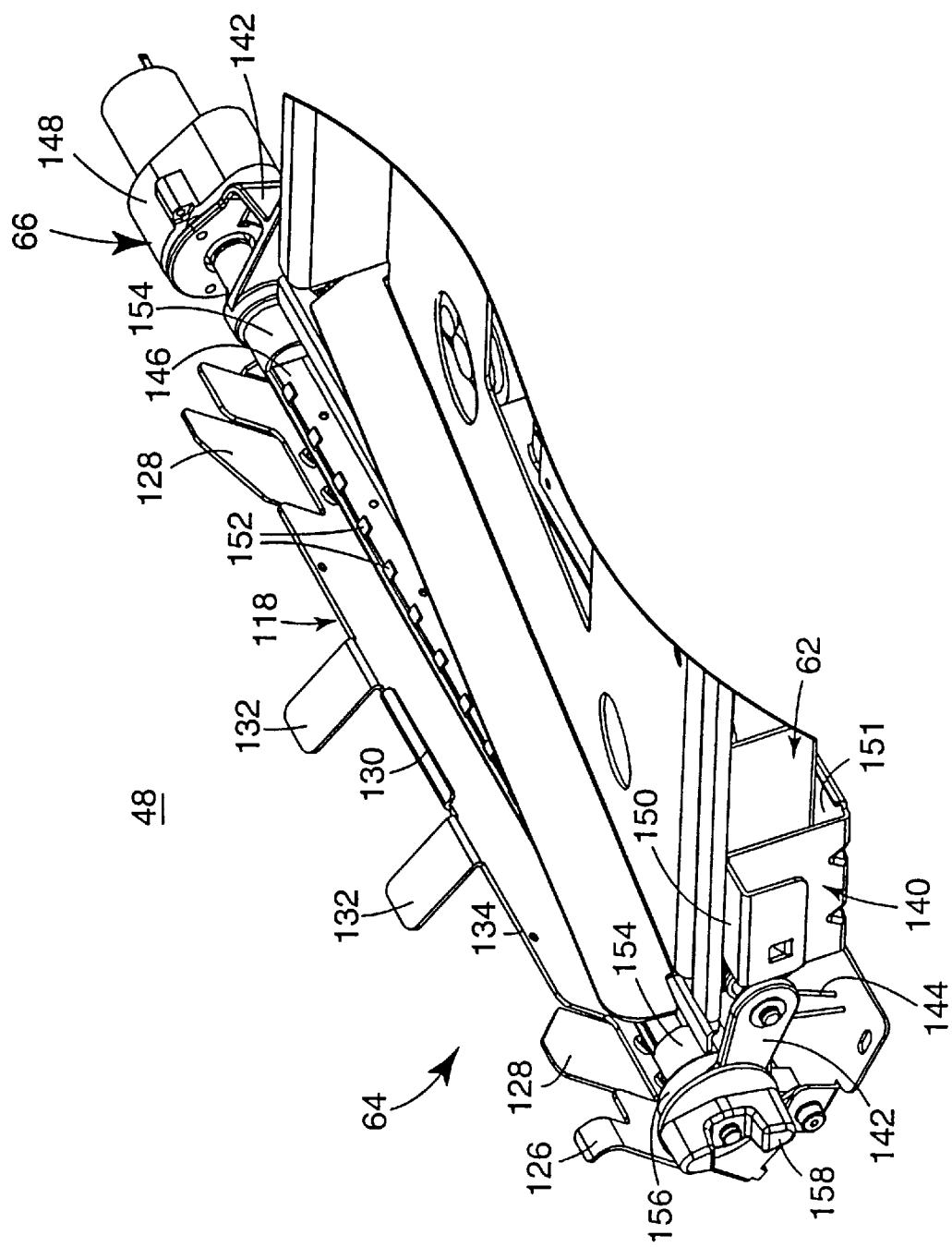
FIG. 7 is an enlarged perspective view of a portion of the cartridge receiving apparatus of FIG. 2 in accordance with the present invention.

As shown in FIG. 7, the cover plate 118 includes a rollback clearance tab 126, separation tabs 128, downward film tab 130 and upward film tabs 132. Each of the rollback clearance tab 126, the separation tabs 128, the downward film tab 130 and the upward film tabs 132 are preferably formed at a leading edge 134 of the cover plate 118.

In a preferred embodiment, cover plate 118 is configured to maneuver, via the biasing means 114 (FIGS. 5 and 6), from a disengaged position (FIG. 7) to an engaged position in which the cover plate 118 abuts the guide frame 62. The rollback clearance tab 126, the downward film tab 130 and the upward film tabs 132 are preferably integral with the cover plate 118. For reasons made clear elsewhere, the separation tabs 128 are preferably made separate from the cover plate 118.

The rollback clearance tab 126 extends from the leading edge 134 of the cover plate 118 and preferably is curved. In this regard, the rollback clearance tab 126 assists in receiving a portion of the rollback mechanism 66 to position the film guard 64 in the disengaged position (FIG. 7).

The separation tabs 128 preferably extend from the leading edge 134 of the cover plate 118 such that in the engaged position, the separation tabs 128 extend over a portion of the film guard 64. The separation tabs 128, though associated with cover plate 118, are more properly described with reference to the film pick-up mechanism 50 (FIG. 1) as the separation tabs 128 form an important part of the functioning of the film pick-up mechanism 50. Therefore, details on the separation tabs are provided below.

The downward film tab 130 extends downwardly from the leading edge 134 of the cover plate 118 in an approximately perpendicular fashion. More particularly, the downward film tab 130 is preferably configured such that in the engaged position, the downward film tab 130 prevents accidental movement of film (not shown) under or below the cover plate 118.

Similarly, the upward film tabs 132 extend upwardly from the leading edge 134 of the cover plate 118 in an approximately perpendicular fashion. More particularly, the upward film tabs 132 are preferably configured such that in the engaged position, the upward film tabs 132 prevent accidental movement of film (not shown) over or above the cover plate 118, for example during film pick-p.

Except for the separation tabs 128, the cover plate 118 is preferably formed of a rigid material such as sheet metal. In this regard, the cover plate 118, including the rollback clearance tab 126, downward film tab 130 and the upward film tabs 132 are formed by known sheet metal manufacturing techniques. The separation tabs 128, however, are preferably plastic. It should be understood that while FIG. 7 shows one preferred embodiment, the various tabs 126–132 can be altered in terms of size, placement and number. For example, while two upward film tabs 132 have been shown extending from an approximately central portion of the cover plate 118, a greater or lesser number could be provided. Further, the upward film tabs 132 can be positioned at different locations along the leading edge 134 of the cover plate 118.

The rollback mechanism 66 is of a type commonly known in the art and includes a carriage 140, opposing rollback links 142a and 142b, opposing torsion springs 144, an elongated shaft 146 and a rollback motor 148. As shown in FIG. 7, the opposing rollback links 142a and 142b are attached to opposite sides of the carriage 140, respectively, and each are biased by one of the opposing torsion springs 144. The elongated shaft 146 extends between the opposing rollback links 142a, 142b and is driven by the rollback motor 148.

The carriage 140 is an elongated drawer-like body configured to slidably engage the rollback slides 108 (FIG. 5) of the guide frame 62 and includes side walls 150 and a base 151. The side walls 150 are attached to the base 151 and are configured to extend along an outer edge of the guide frame 62. While only one of the side walls 150 is shown in FIG. 7, it should be understood that a second one of the side walls 150 is disposed at an opposite side of the guide frame 62. The base 151 is sized to extend along the bottom 94 (FIG. 5) of the guide frame 62 and includes slots (not shown) configured to be translatably received by the rollback slides 108. In a preferred embodiment, the carriage 140 is formed of a rigid material, such as sheet metal. The side walls 150 can be manufactured separately from the base 151, or the carriage 140 can be a singular, integral body.

The opposing rollback links 142a, 142b are each configured to extend from opposite sides of the carriage 140, respectively, and receive a portion of the elongated shaft 146. The opposing rollback links 142a, 142b are each further configured to maintain a portion of one of the opposing torsion springs 144, an opposite end of which is attached to an associated one of the side walls 150 of the carriage 140. Thus, each one of the opposing rollback links 142a, 142b are rotatable with respect to the carriage 140 and are biased to the position shown in FIG. 7 by one of the opposing torsion springs 144. Finally, one of the opposing rollback links 142a includes a cylindrical cam 156 configured to engage the rollback clearance tab 126. The opposing rollback links 142a, 142b are preferably made of a rigid material, such as steel, to support the elongated shaft 146 and the motor 148 relative to the carriage 140. Notably, only one of the opposing torsion springs 144 is shown in FIG. 7 and other biasing means other than the opposing torsion springs 144 may also be useful.

The elongated shaft 146 is configured to extend between the opposing rollback links 142a, 142b and preferably defines teeth 152 and opposing ends 154, and includes a knob 158. Further, one end of the elongated shaft 146 is configured to be driven by the motor 148. The teeth 152 are preferably sized to engage a perforated leading edge of the film cartridge 44 (FIG. 1), as described below. Each of the opposing ends 154 are configured for surface engagement with a portion of the film cartridge 44. Finally, the knob 158 is disposed at an end of the elongated shaft 146 opposite the rollback motor 148. The knob 158 provides for manual rotation of the elongated shaft 146. In a preferred embodiment, the elongated shaft 146 is a cylindrical body extending between the opposing ends 154, and the separately formed teeth 152 are attached to the body. The elongated shaft 146 is preferably a stainless steel core encompassed by a urethane coating, although other materials may also be useful.

The rollback motor 148 is of a type commonly known in the art and is attached to the elongated shaft 146. The rollback motor 148 is further supported by one of the opposing rollback links 142. With this configuration, the rollback motor 148 rotates the elongated shaft 146 relative to the opposing rollback links 142a, 142b.

Operation of the cartridge receiving apparatus 48 is described in greater detail below. Generally speaking, however, the film guard 64 and the rollback mechanism 66 interact as follows. Prior to use, the film guard 64 is forced against the rollback mechanism 66 as shown in FIG. 7. In particular, the biasing means 114 (FIG. 6) pivots the cover plate 118 into contact with the cam surface 156 of the rollback link 142a. Following placement of the film cartridge 44 (FIG. 1) within the guide frame 62, the rollback motor 148 is activated to rotate the elongated shaft 146. The teeth 152 engage a perforated section of a cartridge cover (not shown), causing the elongated shaft 146 to advance relative to the film cartridge 44. The entire rollback mechanism 66 then moves forward along the guide frame 62 via the carriage 140. As the rollback mechanism 66 moves away from the film guard 64, the cover plate 118 is released from the cam surface 156, and the biasing means 114 pivots the cover plate 118 into engagement with the guide frame 62. Conversely, when the rollback mechanism 66 is driven toward the film guard 64, the cam surface 156 contacts the rollback clearance tab 126. Due to the curved configuration of the rollback clearance tab 126, continued movement of the elongated shaft 146 toward the film guard 62 lifts the cover plate 118 on top of the cam surface 156 until the home position, shown in FIG. 7, is achieved.

Figure 8A:
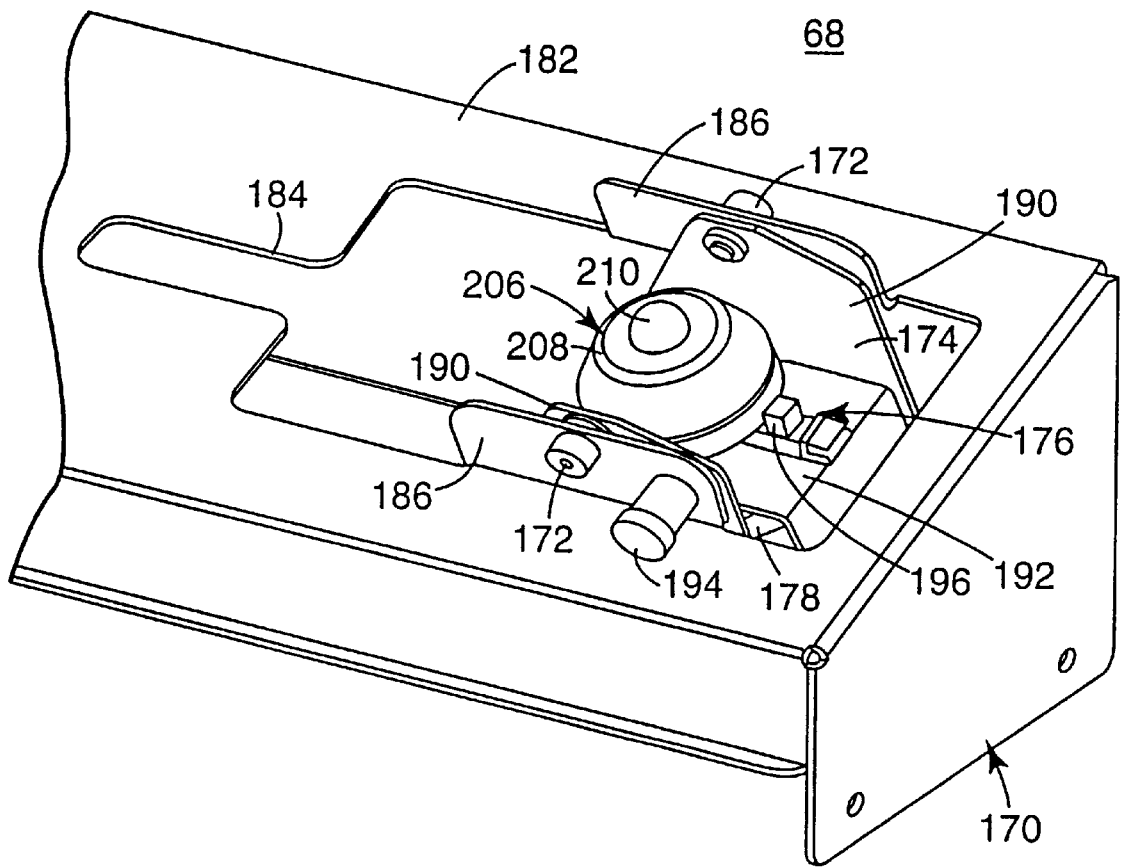
FIGS. 8A and 8B are enlarged side perspective views of an elevator mechanism of the cartridge receiving apparatus of FIG. 2 in accordance with the present invention.
Figure 8B:
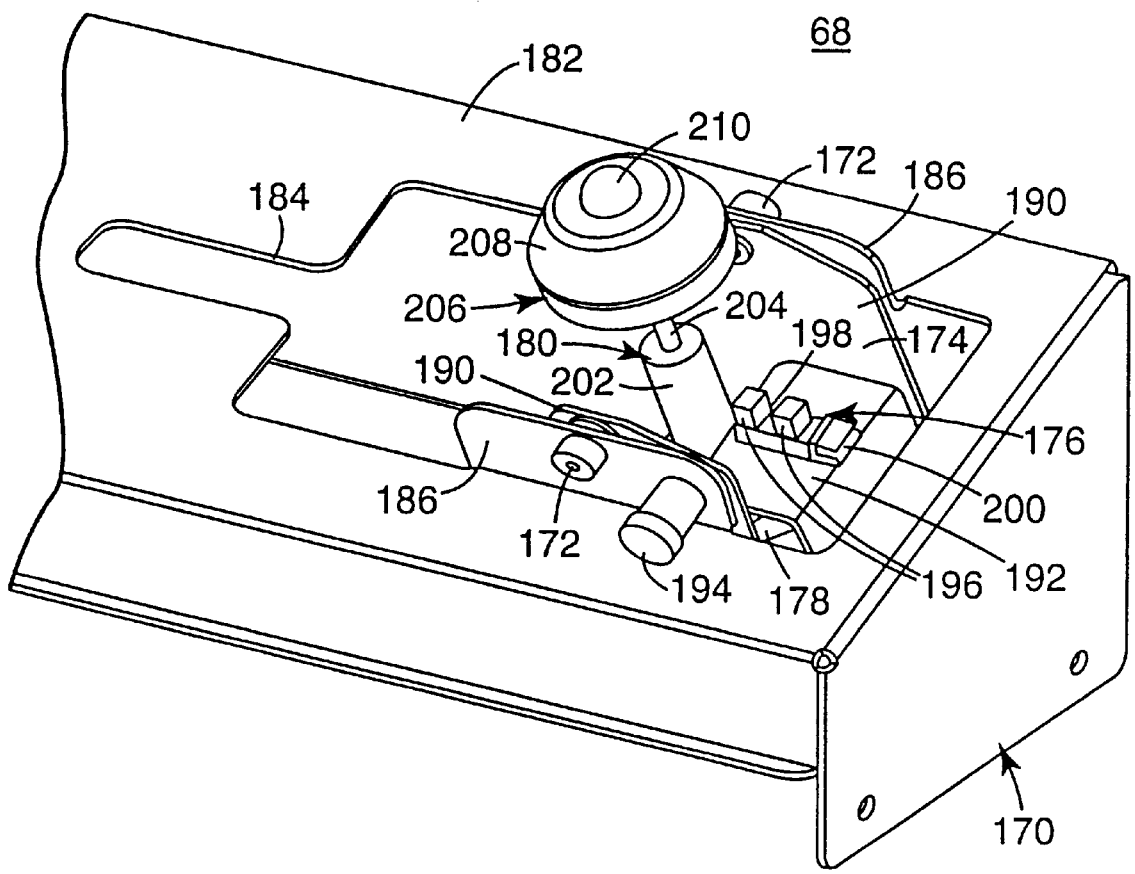

As shown in FIGS. 8A and 8B, the elevator mechanism 68 includes an elevator housing 170, pivotable attachment means 172, a motor frame 174, a sensor 176, a motor 178 (shown partially in FIGS. 8A and 8B), and a linear actuator 180. The elevator housing 170 is disposed within the imager housing 32 (FIG. 1) and maintains the motor frame 174 via the pivotable attachment means 172. The motor frame 174 retains the motor 178 which in turn drives the linear actuator 180. Finally, the sensor 176 is associated with the motor frame 174 to sense positioning of the linear actuator 180.

The elevator housing 170 includes a top surface 182, defining an opening 184, and an opposing pair of flanges 186. The opening 184 is preferably sized to receive and allow passage of the linear actuator 180. The opposing pair of flanges 186 extend from opposite sides of the opening 184 and are configured to receive a portion of the pivotable attachment means 172. In a preferred embodiment, the elevator housing 170 is formed from a rigid material, such as steel. Alternatively, other strong materials may also be useful.

The motor frame 174 is configured to maintain the motor 178 and the linear actuator 180, and includes opposing walls 190 and a shoulder 192. As shown in FIGS. 8A and 8B, the opposing walls 190 are preferably spaced to abut the opposing pair of flanges 186 of the elevator housing 170 and receive a portion of the pivotable attachment means 172. In a preferred embodiment, the motor frame 174 maintains the motor 178 and the linear actuator 180 normal or near normal to the tray 60 (FIG. 2). Finally, the shoulder 192 is preferably sized to receive and maintain the sensor 176.

As previously described, the elevator housing 170 and the motor frame 174 are configured to receive the pivotable attachment means 172. In this regard, each of the pivotable attachment means 172 is preferably a pair of shoulder bolts, each passing through one of the opposing pair of flanges 186 of the elevator housing 170 and secured to one of the opposing walls 190 of the motor frame 174. With this configuration, the pivotable attachment means 172 allows the motor frame 174, and thus the linear actuator 180, to pivot relative to the elevator housing 170 during operation. In one preferred embodiment, the pivotable attachment means 172 further includes a plunger 194 extending from the elevator housing 170 into a slot (not shown) in the motor frame 174. The plunger 194 serves to limit rotational movement of the motor frame 174, and thus the linear actuator 180, relative to the elevator housing 170 such that the linear actuator 180 can track movement of the tray 60.

The sensor 176 is preferably a switch-type sensor commonly known in the art and includes, as best shown in FIG. 8B, guide blocks 196 forming a receiving groove 198 and a port 200. The guide blocks 196 are appropriately spaced such that the receiving groove 198 is sized to receive a portion of the linear actuator 180, as described in greater detail below. In this regard, the sensor 176 is preferably configured to sense presence of a portion of the linear actuator 180 within the receiving groove 198. The port 200 is configured for attachment to a plug (not shown) and associated wiring (not shown) to relay a signal from the sensor 176 to a controller (not shown). Alternatively, the sensor 176 can assume other forms sufficient to sense and signal location of a portion of the linear actuator 180.

The motor 178 is preferably a linear stepper motor commonly known in the art and is powered by a power source (not shown). In this regard, the motor 178 is configured to drive the linear actuator 180, as dictated by the motor frame 174, between a lowered position (FIG. 8A) and a raised position (FIG. 8B). Therefore, the motor 178 may assume other forms capable of producing this desired movement.

The linear actuator 180 includes a cylinder 202, a shaft 204 and a head 206. While preferably not pneumatic, the linear actuator 180 approximates a piston-like form. The shaft 204 is slidably disposed within the cylinder 202 and is driven by the motor 178. The head 206 extends from the shaft 204 opposite the motor 178 and includes a conical side wall 208 and a spherical leading end 210.

As previously described, the linear actuator 180 is preferably configured to be driven via the motor 178. In this regard, the cylinder 202 guides movement of the shaft 204 between the lowered and raised positions. The cylinder 202 and the shaft 204 are preferably made of a rigid material, such as steel.

The head 206 is preferably configured such that the conical side wall 208 engages the sensor 176 in the retracted position (FIG. 8A). Thus, a lower end of the conical side wall 208 forms a rib sized to fit within the receiving groove 198 of the sensor 176. The spherical leading end 210 is preferably in the shape of a ball sized to selectively nest within the socket 76 (FIG. 4) of the tray 60 (FIG. 4) in the extended position. In one preferred embodiment, the head 206 is formed of an aluminum material. Alternatively, other materials, such as steel, may also be useful.

Returning to FIG. 2, the cartridge receiving apparatus 48 is constructed basically as follows. The elevator mechanism 68 is disposed within the imager housing 32 (FIG. 1) such that the linear actuator 180 (FIG. 8B) extends and retracts in an angular fashion relative to a horizontal plane. The guide frame 62 is similarly secured in an angular fashion within the imager housing 32 such that the elevator head passage 98 is aligned with the linear actuator 180. The tray 60 is pivotably secured to the guide frame 62 at the shoulder 84. The film guard 64 is attached to the guide frame 62. Finally, the carriage 140 (FIG. 7) of the rollback mechanism 66 is secured to the rollback slides 108 (FIG. 5) of the guide frame 62. As previously described, prior to use, the rollback mechanism 66 is positioned such that the film guard 64 is biased to the position shown in FIG. 2.

Operation of the cartridge receiving apparatus 48 is described in detail below.

C. Film Pick-Up Mechanism 50

Figure 9:
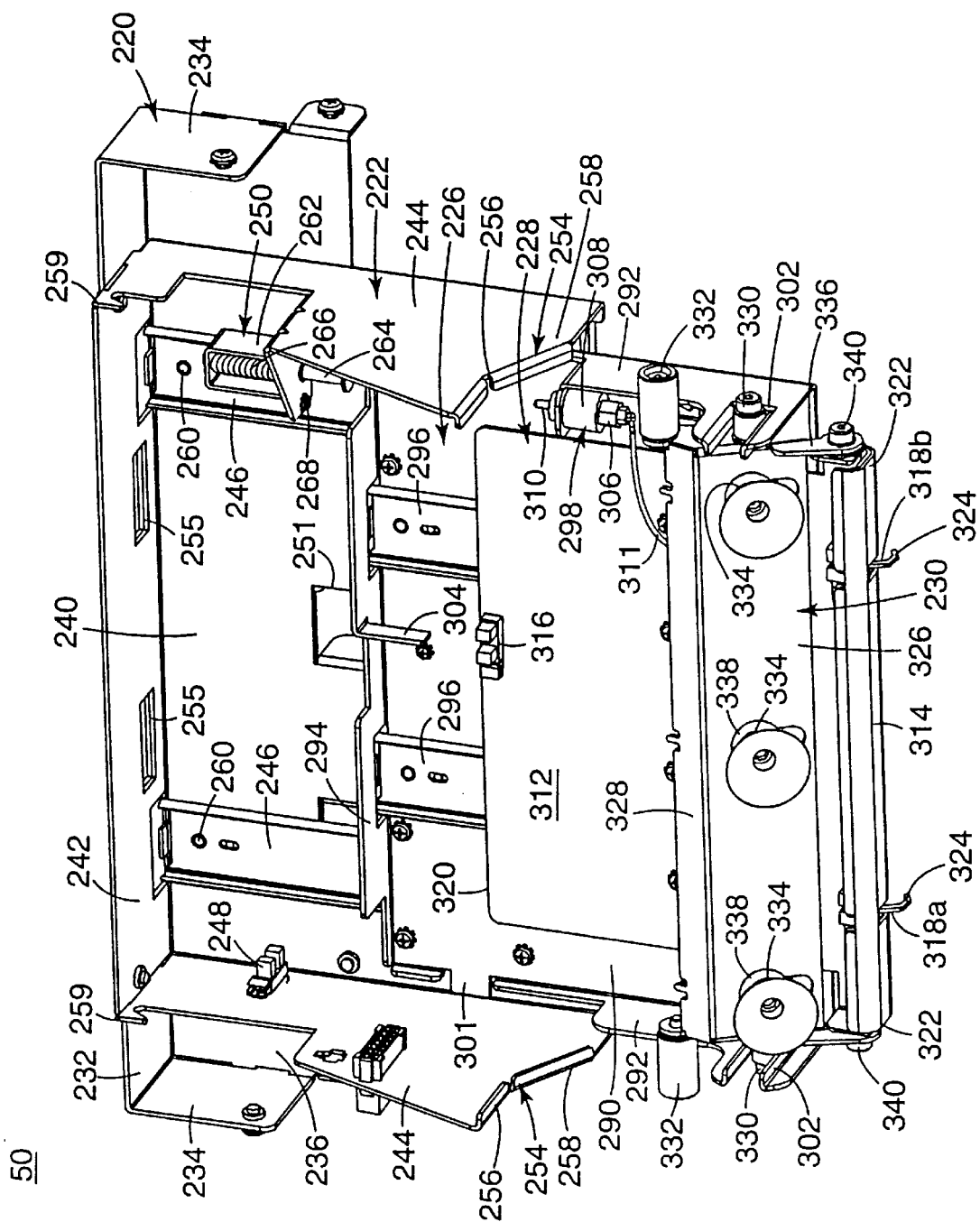
FIG. 9 is a right side perspective view of a film pick-up mechanism of the film supply system in accordance with the present invention.
Figure 10:
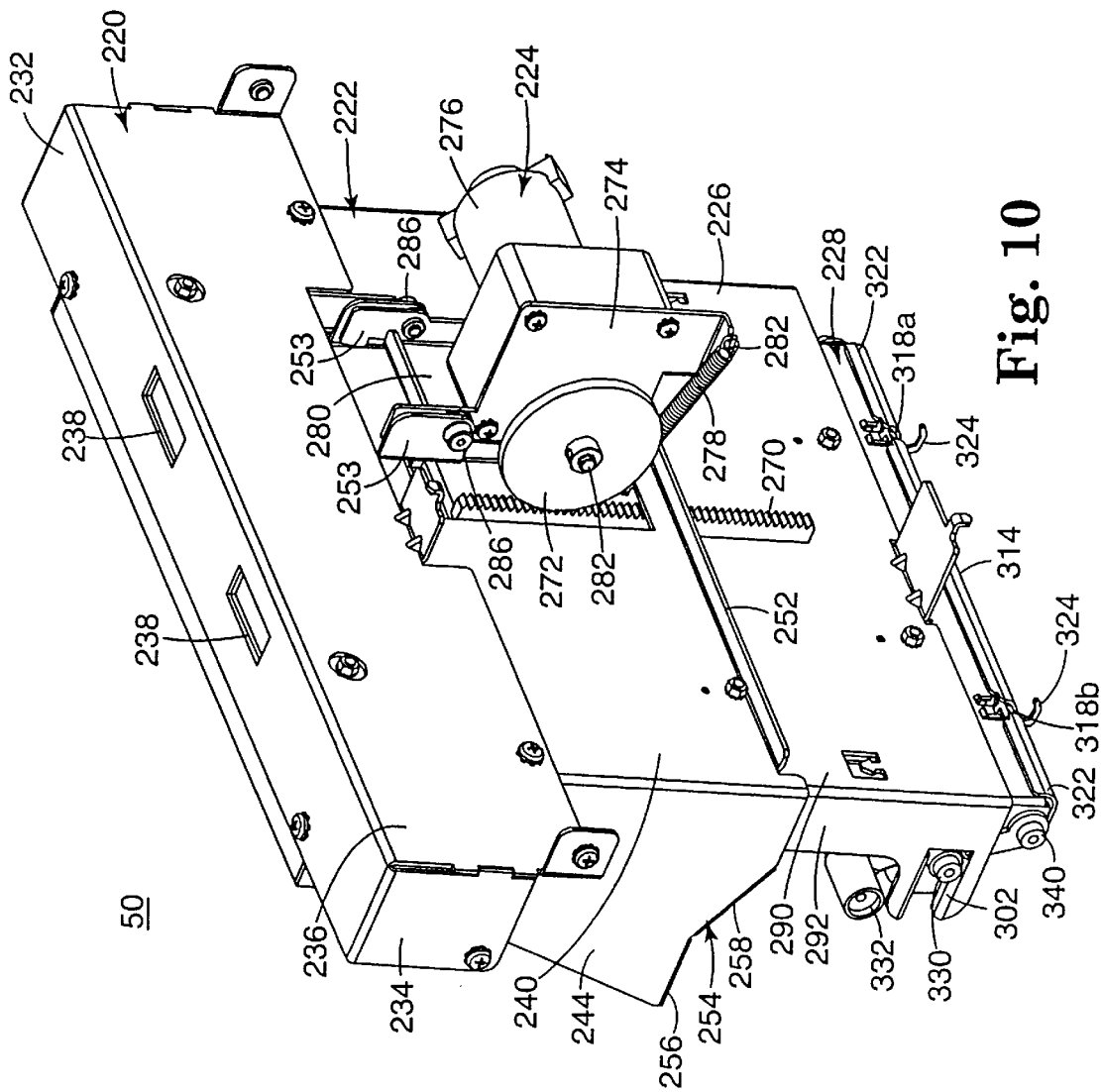
FIG. 10 is a left side perspective view of the film pickup mechanism of FIG. 9 in accordance with the present invention.

FIGS. 9 and 10 show a preferred embodiment of the film pick-up mechanism 50. Notably, for ease of illustration, the film pick-up mechanism 50 is shown in FIGS. 9 and 10 in a substantially vertical orientation as opposed to the preferred angular orientation within the imager housing 32 (FIG. 1). The film pick-up mechanism 50 includes a pick-up attachment housing 220, a retention frame 222, a drive means 224, a drive frame 226, a heel plate 228 and a cup plate 230. The pick-up attachment housing 220 is configured to be selectively secured within the imager housing 32 (FIG. 1). The retention frame 222 is secured to the pick-up attachment housing 220 and slidably receives the drive frame 226. The drive means 224 is configured to maneuver the drive frame 226 relative to the retention frame 222. The heel plate 228 extends from the drive frame 226 opposite the retention frame 222. Finally, the cup plate 230 is pivotably attached to the heel plate 228.

The pick-up attachment housing 220 is preferably a singular body defined by a leading wall 232, side walls 234 and a back wall 236. The leading wall 232 includes clearance openings 238 sized to allow passage of a portion of the drive frame 226 during use.

In a preferred embodiment, the pick-up attachment housing 220 is formed of a rigid material, such as sheet metal. The various components are preferably formed through a bending process. Alternatively, other lightweight materials may also be useful and the components attached by adhesives, welds, screws, etc.

The retention frame 222 includes a base 240, a top wall 242, opposing side walls 244, frame slides 246, a driver sensor 248 and a plunger 250. The base 240, the top wall 242 and the opposing side walls 244 are preferably a singular body attached to the pick-up attachment housing 220. The frame slides 246 extend from a front surface of the base 240. The driver sensor 248 is disposed along one of the opposing side walls 244. Finally, the plunger 250 is attached to the other of the opposing side walls 244.

The base 240 is a relatively flat body defining an opening 251, and includes a reinforcement 252 and flanges 253 on a rear side thereof, as best shown in FIG. 10. The opening 251 is preferably sized to enable activation of the drive means 224, as described in greater detail below. The reinforcement 252 provides additional stability during use. Finally, the flanges 253 are configured to provide attachment surfaces for maintaining portions of the drive means 224.

The top wall 242 and the opposing side walls 244 are configured to extend from the base 240 as shown in FIG. 9. The top wall 242 preferably includes clearance openings 255 positioned to correspond with the clearance openings 238 in the leading wall 232 of the pick-up attachment housing 220. Each of the opposing side walls 244 includes a frame shelf 254 configured to selectively abut a portion of the cup plate 230 as described in greater detail below. In this regard, each of the frame shelves 254 of the opposing side walls 244 includes a substantially horizontal section 256 and an angled section 258. In one preferred embodiment, the horizontal section 256 and the angled section 258 of each of the opposing side walls 244 forms a lip extending in a generally perpendicular fashion from the opposing side walls 244. Finally, in a preferred embodiment, each of the side walls 244 forms a hook 259. The hooks 259 are configured to mate with a portion of the imager housing 32 (FIG. 1) to assist in selectively securing the film pick-up mechanism 50 within the imager housing 32.

In a preferred embodiment, the base 240, the top wall 242 and the opposing side walls 244 are made from a relatively rigid material, such as sheet metal. With this material, the top wall 242 and the opposing side walls 244 can be formed relative to the base 240 via standard sheet metal bending techniques. Alternatively, other materials and attachment methods may also be useful.

The frame slides 246 are configured to extend in a parallel fashion along the base 240 to slidably receive a portion of the drive frame 226. In a preferred embodiment, the frame slides 246 are made of a relatively rigid material, such as steel, and are fastened to the base 240 by way of screws 260. Alternatively, other forms of attachment, such as an adhesive, rivets or weld, may also be useful.

As best shown in FIG. 9, the driver sensor 248 is of a type commonly known in the art configured to sense the presence of a portion of the drive frame 226, described in greater detail below. The driver sensor 248 is preferably a switch-type sensor, configured to deliver a signal via wires (not shown) to a controller (not shown) indicative of positioning of the drive frame 226 relative to the retention frame 222. Alternatively, the driver sensor 248 may assume other forms.

The plunger 250 includes a plunger frame 262, a shaft 264 and a spring 266. The plunger frame 262 slidably maintains the shaft 264. Further, the spring 266 is disposed within the plunger frame 262 and biases the shaft 264 toward a forward end 268 of the plunger frame 262. Finally, the plunger frame 262 is configured to be attached to a portion of one of the opposing side walls 244. As explained in greater detail below, location of the plunger 250 along the one of the opposing side walls 244 is made relative to a portion of the drive frame 226 such that a portion of the drive frame 226 contacts the shaft 264 at a desired position of the drive frame 226 relative to the retention frame 222.

The drive means 224, shown best in FIG. 10, includes a rack 270, a pinion 272, a motor frame 274, a motor 276 and a biasing means 278. The rack 270 is attached to the drive frame 226 and is configured to selectively engage the pinion 272. The pinion 272 is driven by the motor 276, which is maintained relative to the retention frame 222 by the motor frame 274 and the biasing means 278.

The rack 270 is of a type commonly known in the art, configured for attachment to a rear portion of the drive frame 226. In this regard, the rack 270 is made of a strong, rigid material, such as steel, machined to form a toothed top surface. The rack 270 can be made of other materials, however, and is preferably attached to the drive frame 226 by screws. Other forms of attachment, such as welding, adhesive, etc., may also be useful.

The pinion 272 is a disc-shaped body having a toothed outer circumference configured to mate with the rack 270. In a preferred embodiment, the pinion 272 is made of plastic, although other rigid materials may also be useful.

The motor frame 274 is configured to pivotably secure the motor 276 to the retention frame 222 and includes an upper portion 280 and a lower clip 282. The upper portion 280 is configured to mate within the motor receiving flanges 253 of the retention frame 222. In this regard, the upper portion 280 is maintained within the motor receiving flanges 253 by shoulder bolts 286. With this preferred design, the motor 276, and thus the pinion 272, can pivot relative to the rack 270. The lower clip 282 is configured to receive and maintain a portion of the biasing means 278. In a preferred embodiment, the motor frame 274 is made of a rigid material, such as steel. Alternatively, other materials may also be useful.

The motor 276 is preferably a DC gear motor having a shaft attached to the pinion 272 by a dowel pin 287. With this arrangement, the motor 276 rotates the pinion 272 when activated. The motor 276 is preferably powered by an external power source (not shown) connected to the motor 276 by wiring (not shown). Alternatively, the motor 276 may assume other forms commonly known in the art and may be powered by other types of power supplies.

The biasing means 278 is preferably a spring configured for attachment at opposite ends to the lower clip 282 of the motor frame 274 and the retention frame 222, respectively. With this preferred configuration, the biasing means 278 biases the motor frame 274, and therefore the motor 276, toward the retention frame 222 such that constant contact between the rack 270 and the pinion 272 is achieved. Notably, the biasing means 278, while preferably a spring, can assume other forms, such as a rigid connector.

The drive frame 226 includes a base 290, opposing side walls 292, a head 294, heel slides 296, a pressure relief valve 298 and biasing means 300 (described below with reference to FIG. 11). The base 290 is slidably maintained by the retention frame 222. The heel slides 296 are attached to the base 290. Similarly, the pressure relief valve 298 is attached to the base 290. Finally, the biasing means 300 extends between the drive frame 226 and the cup plate 230.

In one preferred embodiment, the base 290, the opposing side walls 292 and the head 294 are formed as a singular body. As shown in FIG. 9, the opposing side walls 292 and the head 294 extend from the base 290 in a generally perpendicular fashion.

As shown in FIG. 10, a rear side of the base 290 is configured to receive the rack 270 of the drive means 224. In this regard, the rack 270 is disposed centrally along a length of the base 290. Conversely, as shown in FIG. 10, a front side view the base 290 includes a drive positioning tab 301, and is configured to receive and maintain the heel slides 296. In this regard, the heel sides 296 are configured to slidably receive the heel plate 228.

The opposing side walls 292 are approximately identical, extending from the base 290 in a perpendicular fashion. Each of the opposing side walls 292 forms a slot 302 at a lower end thereof. As described in greater detail below, each of the slots 302 are sized to slidably receive a portion of the cup plate 230.

The head 294 extends in a perpendicular fashion from the base 290 and includes a sensor tab 304. The sensor tab 340 extends downwardly from the head 294, generally parallel to the base 290. The sensor tab 304 is preferably sized to provide an indication of the position of the heel plate 228 and the cup plate 230 relative to the drive frame 226, as described below.

In a preferred embodiment, the base 290, the opposing side walls 292 and the head 294 are formed from a relatively rigid material, such as steel. Importantly, the opposing side walls 292 and the head 294 must be affixed to the base 290 so as to maintain their generally perpendicular orientation. In this regard, the opposing side walls 292 and the head 294 may be formed relative to the base 290 by a bending process, or may be secured to the base 290 by a weld or other attachment. Alternatively, other rigid materials, such as reinforced plastic, may also be useful.

The pressure relief valve 298 is preferably a poppet-type valve commonly known in the art and includes an inlet 306, a valve body 308 and a stem 310. The inlet 306 is attached to tubing 311 otherwise connected to suction cups of the cup plate 230 to form a closed pressure system. The valve body 308 is fluidly connected to the inlet 306 for receiving and maintaining pressurized fluid. Additionally, the valve body 308 is configured to be attached to one of the opposing side walls 292 of the drive frame 226 by a threaded nut. Finally, the stem 310 is designed to selectively release pressurized fluid otherwise maintained within the valve body 308. With this preferred configuration, the pressure relief valve 298 is able to provide a passive vacuum during operation. It should be recognized, however, that other designs configured to facilitate retrieval of sheets of photosensitive film are equally acceptable.

Figure 11:
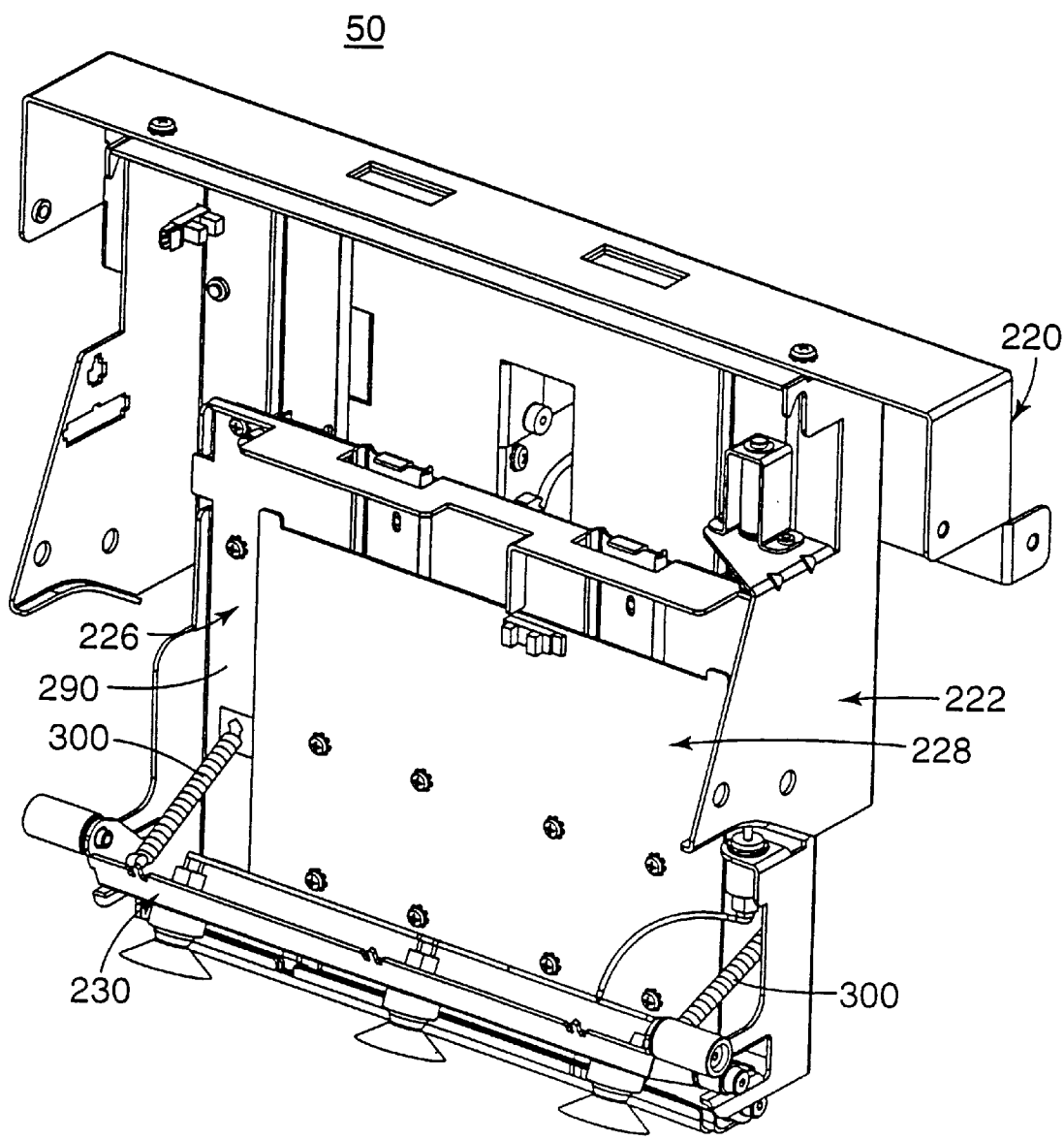
FIG. 11 is a right side perspective view of the film pick-up mechanism of FIG. 9 having a cup plate rotated to a cup down position in accordance with the present invention.

With reference to FIG. 11, the biasing means 300 are preferably two springs extending between the base 290 of the drive frame 226 and the cup plate 230. For purposes of illustrating the preferred biasing means 300, FIG. 11 depicts the cup plate 230 as being rotated downwardly relative to the drive frame 226. Generally, the biasing means 300 is configured to bias, or rotate, the cup plate 230 upwardly or toward the drive frame 226. It will be recognized, therefore, that the biasing means 300 can be replaced by other devices configured to achieve the same result.

Returning to FIGS. 9 and 10, the heel plate 228 includes a central portion 312, a film contact body 314, a cup engage sensor 316 and film sensors 318a and 318b. The central portion 312 is configured to be slidably received within the drive frame 226 such that the film contact body 314 extends away from the drive frame 226. The cup engage sensor 316 is positioned on the central portion 312 to selectively interact with the drive positioning tab 304. Finally, the film sensors 318a and 318b are disposed along the film contact body 314.

The central portion 312 is preferably a singular body configured to be slidably received by the heel slides 296. In this regard, the central portion 312 is appropriately sized to fit between the opposing side walls 292 of the drive frame 226, as well as clear the pressure relief valve 298. The central portion 312 is defined by an upper edge 320 and terminates in the film contact body 314. The central portion 312 is preferably made of a strong, rigid material, such as steel. Alternatively, other rigid materials may also be useful.

The film contact body 314 preferably includes a rounded outer surface and is defined by opposing ends 322. In this regard, the rounded outer surface is configured to interact with a layer of film (not shown) without causing any damage thereto, and may include an adhesive backed foam to minimize potential damage. In a preferred embodiment, the central portion 312 and the film contact body 314 are formed as a singular body, but may be manufactured separately.

The cup engage sensor 316 is preferably a switch-type sensor commonly known in the art and is positioned near the upper edge 320 of the central portion 312. In this regard, the cup engage sensor 316 is sized to selectively receive the drive positioning tab 304 of the drive frame 226. Thus, the cup engage sensor 316 is configured to sense positioning of the heel plate 228 relative to the drive frame 226 via the drive positioning tab 304. As will become more clear with reference to the cup plate 230, the cup engage sensor 316 and the drive positioning tab 304 also serve to provide an indication of rotational position of the cup plate 230. Generally speaking, the drive positioning tab 304 will engage the cup engage sensor 316 only when the cup plate 230 has been rotated to a predetermined position as dictated by the heel plate 228. It will be recalled that the heel plate 228 is slidably connected to the drive frame 226. Thus, due to this interaction between the drive frame 226, the heel plate 228 and the cup plate 230, the cup engage sensor 316 is positioned to interact with the drive positioning tab 304 upon rotation of the cup plate 230 to the predetermined position. The cup engage sensor 316 is connected to an external controller (not shown) by wiring (not shown) to provide a signal indicative of this positioning.

The first and second film sensors 318a and 318b are secured to the film contact body 314 as shown in FIGS. 9 and 10, and each include an extension arm 324. The first and second film sensors 318a and 318b are preferably switch-type sensors commonly known in the art. In this regard, the extension arm 324 of each of the first and second film sensors 318a and 318b is retractable relative to the film contact body 314. Thus, upon contact with an article, such as a sheet of film, the extension arm 324 of each of the first and second film sensors 318a and 318b retracts toward the film contact body 314. The first and second film sensors 318a and 318b provide a signal indicative of this retraction to an external controller (not shown) via wiring (not shown). While the first and second film sensors 318a and 318b have been preferably described as being switch-type sensors, other sensors having the ability to ascertain contact with an article, such as a sheet of film, may also be useful.

The cup plate 230 includes a base 326, a neck 328, an opposing pair of short rollers 330, an opposing pair of long rollers 332, a plurality of suction cup bodies 334 and an opposing pair of pivot arms 336. The base 326 and the neck 328 preferably form an integral body. The opposing pair of short rollers 330 extend from opposite sides of the base 326, respectively. Similarly, the opposing pair of pivot arms 336 extend from opposite sides of the base 326, respectively. The opposing pair of long rollers 332 extend from opposite sides of the neck 328, respectively. Finally, the plurality of cup bodies 334 are maintained by the base 326.

The base 326 and the neck 328 are preferably formed as a singular body made of a rigid material, such as steel. The base 326 includes a plurality of slots 338. Each of the plurality of slots 338 are sized to receive and maintain a portion of one of the plurality of suction cup bodies 334, as described in greater detail below.

The opposing pair of pivot arms 336 extend from the base 326, opposite the neck 328. Each of the opposing pair of pivot arms 336 is preferably configured to be pivotably attached to one of the opposing ends 322 of the film contact body 314, such as by a shoulder bolt 340, thereby defining a pivot point. Thus, as shown in FIG. 9, the cup plate 230 is rotatable relative to the heel plate 228 at the pivot point 340. In a preferred embodiment, the opposing pair of pivot arms 336 are formed of a rigid material, such as steel, and are welded to the base 326. Alternatively, the base 326 and the opposing pair of pivot arms 336 may be integrally formed.

The opposing pair of short rollers 330 are configured to be attached to, and extend from, opposite sides of the base 326, respectively. Further, each of the opposing pair of short rollers 330 are sized to be slidably received within one of the slots 302 of the drive frame 226, such that each of the opposing pair of short rollers 330 will preferably rotate or slide within the slot 302. In this regard, each of the opposing pair of short rollers 330 is preferably rotatable, made of a low-friction, wearable material, such as plastic. Alternatively, other materials, such as steel may also be useful.

The opposing pair of long rollers 332 are configured to be attached to, and extend from, opposite sides of the neck 328, respectively. In this regard, each of the opposing pair of long rollers 332 is sized to extend from the neck 328 a sufficient distance to contact the frame shelf 254 when the cup plate 230 is raised relative to the retention frame 222. In a preferred embodiment, each of the opposing pair of long rollers 332 is configured to roll along the frame shelf 254, although a sliding contact may also be provided. Each of the opposing pair of long rollers 332 is preferably made of a low-friction, wearable material, such as plastic. Alternatively, other materials, such as plastic or rubber, may also be useful.

Figure 12:
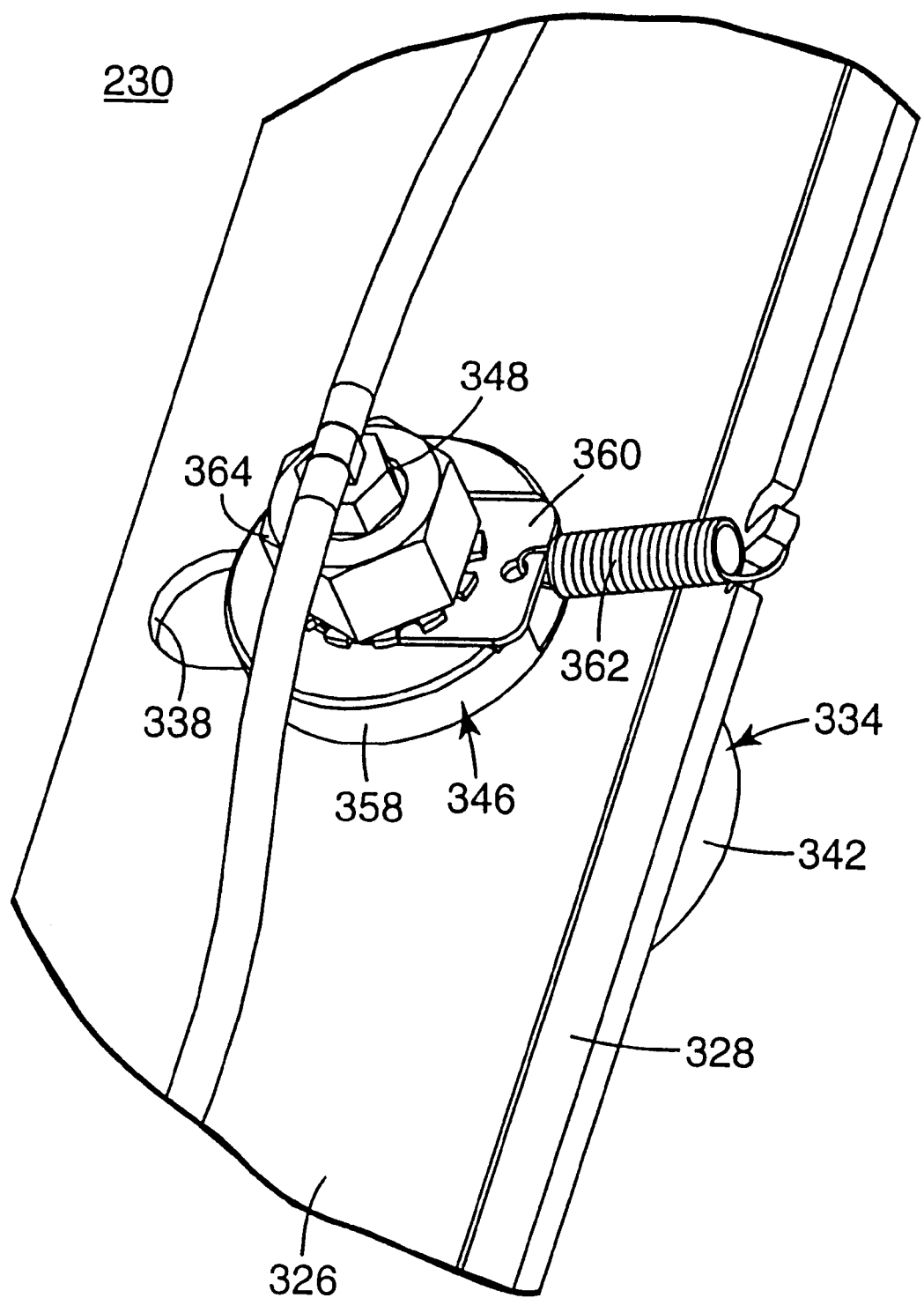
FIG. 12 is an enlarged perspective view of a portion of a cup plate of the film pick-up mechanism of FIG. 9 in accordance with the present invention.
Figure 13:
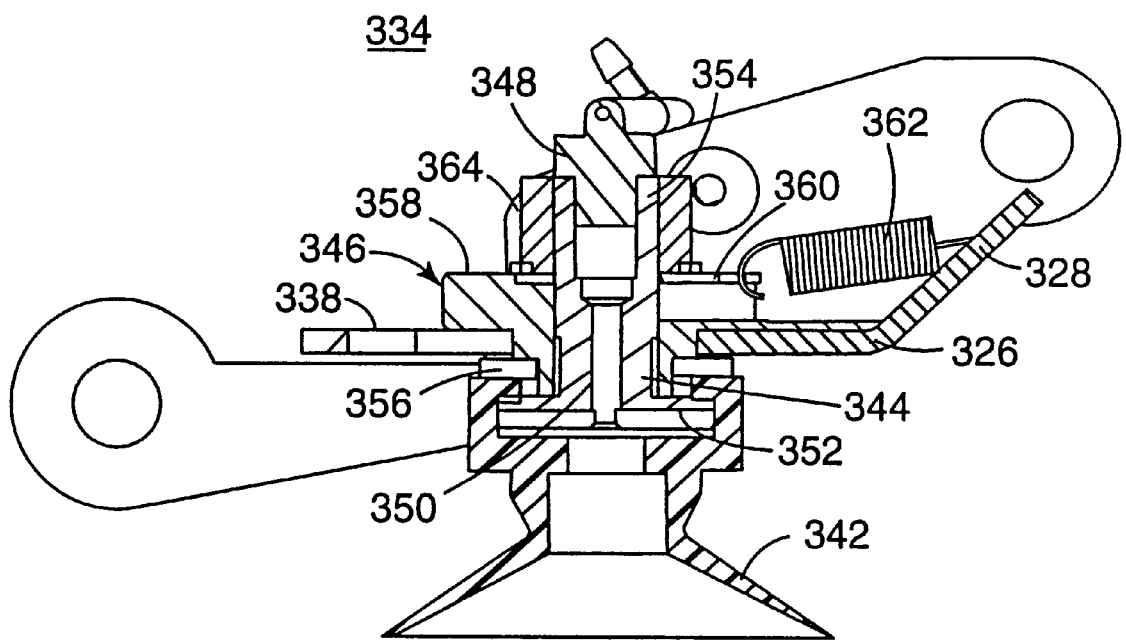
FIG. 13 is a cross-sectional view of a suction cup body in accordance with the present invention.

Each of the plurality of suction cup bodies 334 includes a suction cup 342, connection bolt 344, retaining means 346 and an outlet 348, as shown in FIGS. 12 and 13. The suction cup 348 is fluidly connected to the connection bolt 344, which in turn is fluidly connected to the outlet 348. The retaining means 346 slidably attaches the connection bolt 344 to the base 326 of the cup plate 230.

The suction cup 342 is preferably made of a flexible material, such as an elastomer or rubber, designed to seal against a sheet of photosensitive film. Alternatively, other forms of material may also be useful.

The connection bolt 344 includes a central passage 350 and is preferably sized to be slidably maintained within one of the plurality of slots 338 in the base 326. The connection bolt 344 is configured to receive the suction cup 342 at an inlet end 352 and the outlet 348 at an exit end 354. In this regard, the central passage 350 extends from the inlet end 352 to the exit end 354 such that the connection bolt 344 provides a fluid connection between the suction cup 342 and the outlet 348. Finally, in a preferred embodiment, the exit end 354 of the connection bolt 344 is exteriorly threaded.

The retaining means 346 is configured to maintain the connection bolt 344, and thus the attached suction cup 342 and the outlet 348, relative to the base 326. In one preferred embodiment, the retaining means 146 includes a washer 356, a slider 358 defining a shoulder 359, a clip 360, a spring 362 and a lock nut 364. The washer 356 and the slider 358 are configured to be coaxially disposed about the connection bolt 344. The clip 360 is similarly sized to ride over the connection bolt 344 and is configured to receive an end of the spring 362. An opposite end of the spring 362 is configured to be attached to the neck 328. Finally, the lock nut 364 is configured to threadably engage an exterior surface of the exit end 354 of the connection bolt 344.

With reference to FIG. 13, the retaining means 346 secures the connection bolt 344 within the slot 338 in the base 326 basically as follows. The washer 356 is coaxially placed over the connection bolt 344, which is then placed within the slot 338. Thus, the washer 356 abuts a bottom surface of the base 326. The slider 358 is coaxially disposed over the connection bolt 344, such that the slider 358 abuts a top surface of the base 326 and the shoulder 359 extends into the slot 338. The clip 360 is placed over the connection bolt 344 and nests within a slot in the slider 358. Finally, the lock nut 364 threadably engages the exit end 354 of the connection bolt 344, and abuts the slider 358. More particularly, the lock nut 364 serves to tighten the slider 358 and the washer 356 such that the slot 338 is entrapped by the washer 356 and the slider 358. In a preferred embodiment, the washer 356 and the slider 358 are made of a low friction plastic and are appropriately spaced to allow the connection bolt 344 to slide relative to the slot 338 along the shoulder 359 of the slider 358.

Once assembled, the spring 362 is secured to the clip 362 and the neck 328. Finally, the outlet 348 is connected to the tubing 311. Notably, the tubing 311 fluidly connects each of the plurality of suction cup bodies 334 to the pressure relief valve 298 (FIG. 9). Thus, a passive vacuum is available for each of the plurality of suction cup bodies 334.

With the above-described construction, the spring 362 biases the cup body 334 toward the neck 328. As described in greater detail below, however, upon contact with a sheet of film (not shown) and rotation of the cup plate 230, the cup body 334 moves within the slot 338 when a force sufficient to overcome the biasing force of the spring 362 is applied to the cup body 334. While the retaining means 346 has been preferably described as including a number of components, such as the washer 356 and the slider 358, other designs configured to allow the suction cup bodies 334 to slide relative to the base 326 are also acceptable.

Returning to FIGS. 9 and 10, the film pick-up mechanism 50 is constructed basically as follows. The retention frame 222 is secured to the pick-up attachment housing 220 via screws, welding, etc. The drive frame 226 is slidably secured to the retention frame 220 over the frame slides 246. The drive means 224 is attached to the retention frame 222 such that the pinion 272 engages the rack 270. The heel plate 228 is slidably secured to the drive frame 226 over the heel slides 296. The cup plate 230 is pivotably attached to the heel plate 228 via the opposing pivot arms 336 such that the opposing pair of short rollers 330 are disposed within the slots 302 of the drive frame 226, respectively. The biasing means 300 secures the cup plate 230 to the drive frame 226 so as to bias the cup plate 230 upwardly relative to the driver frame 226 about the hinge point 340. As will be described with reference to operation of the film pick-up mechanism 50, the cup plate 230 is rotatable from a maximum bend position in which the cup plate 230 is nearly parallel to the heel plate 228, and a cup down position in which the cup plate 230 is approximately perpendicular to the heel plate 228. The biasing means 300 biases the cup plate 230 to the maximum bend position. Additionally, the biasing means 300 biases the heel plate 228 toward the cup plate 230, or downwardly relative to the drive frame 226.

With the above-described configuration, the drive frame 226 is slidable relative to the retention frame 222. Further, the heel plate 228 is slidable relative to the drive frame 226. Finally, the cup plate 230 is pivotable relative to the heel plate 228. The drive means 224 controls movement of the drive frame 226 relative to the retention frame 222 such that the drive frame 226 is maneuvered between a home position, in which the head 294 is proximal the top wall 242 of the retention frame 228, and an extended position (FIG. 9). In the extended position, the biasing means 300 functions to bias the heel plate 228 such that the upper edge 320 of the heel plate 228 is spaced from the head 294 of the drive frame 226. During use, when the heel plate 228 contacts a stack of film, the drive frame 226 slides downwardly relative to the heel plate 228 such that the upper edge 320 is proximal the head 294 of the drive frame 226.

Figure 14:
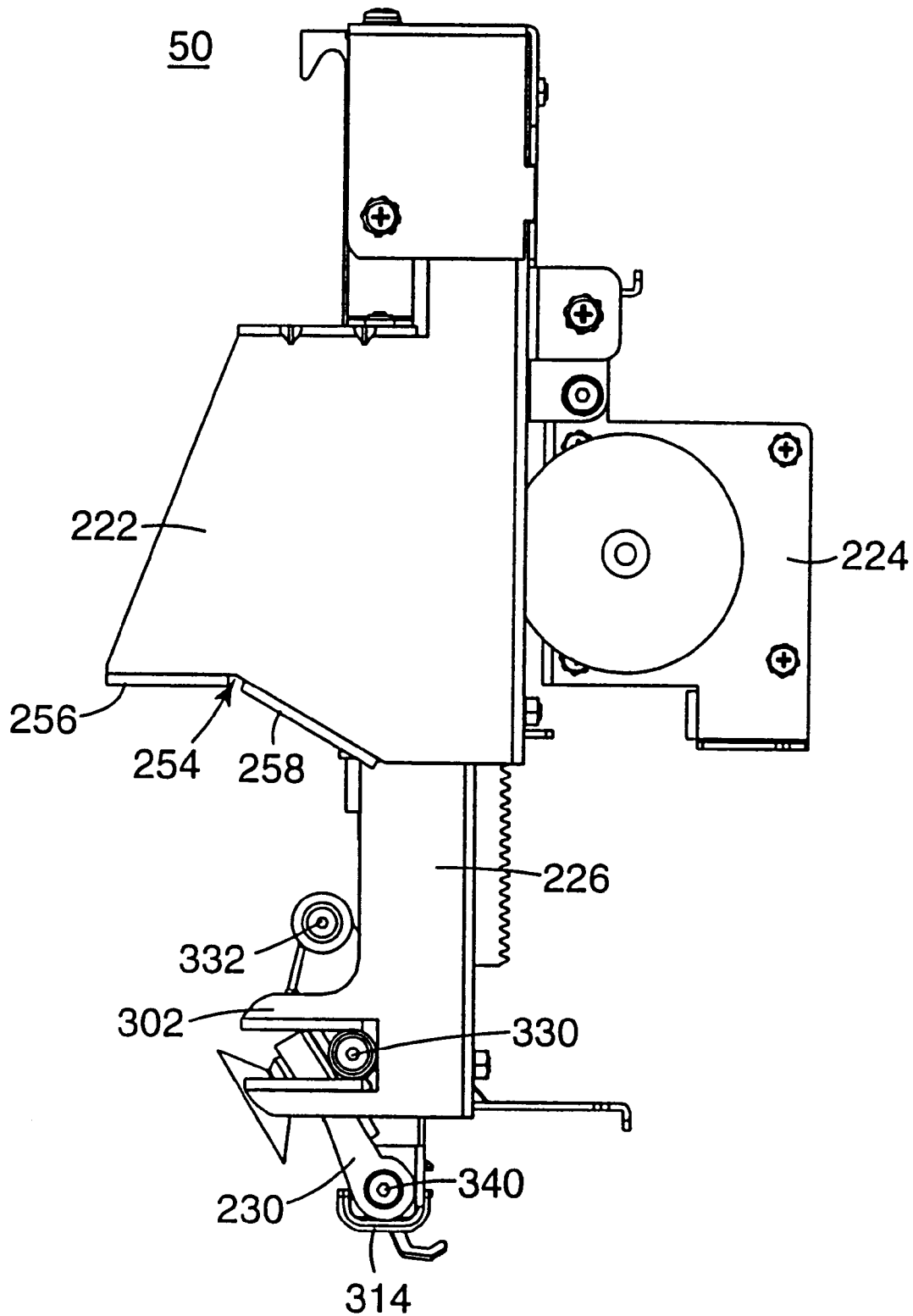
FIG. 14 is a front view of the film pick-up mechanism of FIG. 9 in accordance with the present invention.

Rotation of the cup plate 230 about the hinge point 340 is directed by interaction of the opposing pair of short rollers 330 within the slots 302 of the drive frame 226, as best shown in FIG. 14. For example, upon contact of the film contact body 314 with an article, such as a stack of film, further downward movement of the drive frame 226 imparts a force on the opposing pair of short rollers 330 at the slots 302. This force is translated to the hinge point 340, causing the cup plate 230 to rotate. Thus, the cup plate 230 is rotatable between the maximum bend position (FIG. 14) and the cup down position. In this regard, the cup plate 230 rotates through an arc of approximately 30–60°, preferably 55°. It should be understood from the above discussion that in a basic form, the opposing pair of short rollers 330 serve as a drive arm for directing rotational movement of the cup plate 230, via the drive frame 226, to pick up (or retrieve) and bend a sheet of film.

Interaction of the opposing pair of long rollers 332 with the retention frame 222 is also best shown with reference to FIG. 12. Once again, the film pick-up mechanism 50 is shown in FIG. 12 with the drive frame 226 in an extended position, while the cup plate 230 is in the maximum bend position. An upward stroke of the drive means 224 maneuvers the drive frame 226 within the retention frame 222, during which the opposing pair of long rollers 332 (one of which is shown in FIG. 14) contacts the frame shelf 254. More particularly, the opposing pair of long rollers 332 first contact the angled section 258 of the frame shelf 254. As the drive frame 226 continues through the upward stroke, interaction of the opposing pair of long rollers 332 with the angled section 258 causes the cup plate 230 to pivot at the heel pivot point 340. Thus, the cup plate 230 is maneuvered from the maximum bend position (FIG. 14) to the cup down position. This preferred pivoting action of the cup plate 230 relative to the drive frame 226 continues during the upward stroke, with the opposing pair of long rollers 332 transferring from the angled section 258 of the frame shelf 254 to the horizontal section 256. It should be understood from the above discussion that in a basic form, the opposing pair of long rollers 332 serve as a drive arm for direction rotational movement of the cup plate 230, via the frame shelf 254, to the cup down position at the top of the upward stroke.

Figure 15:
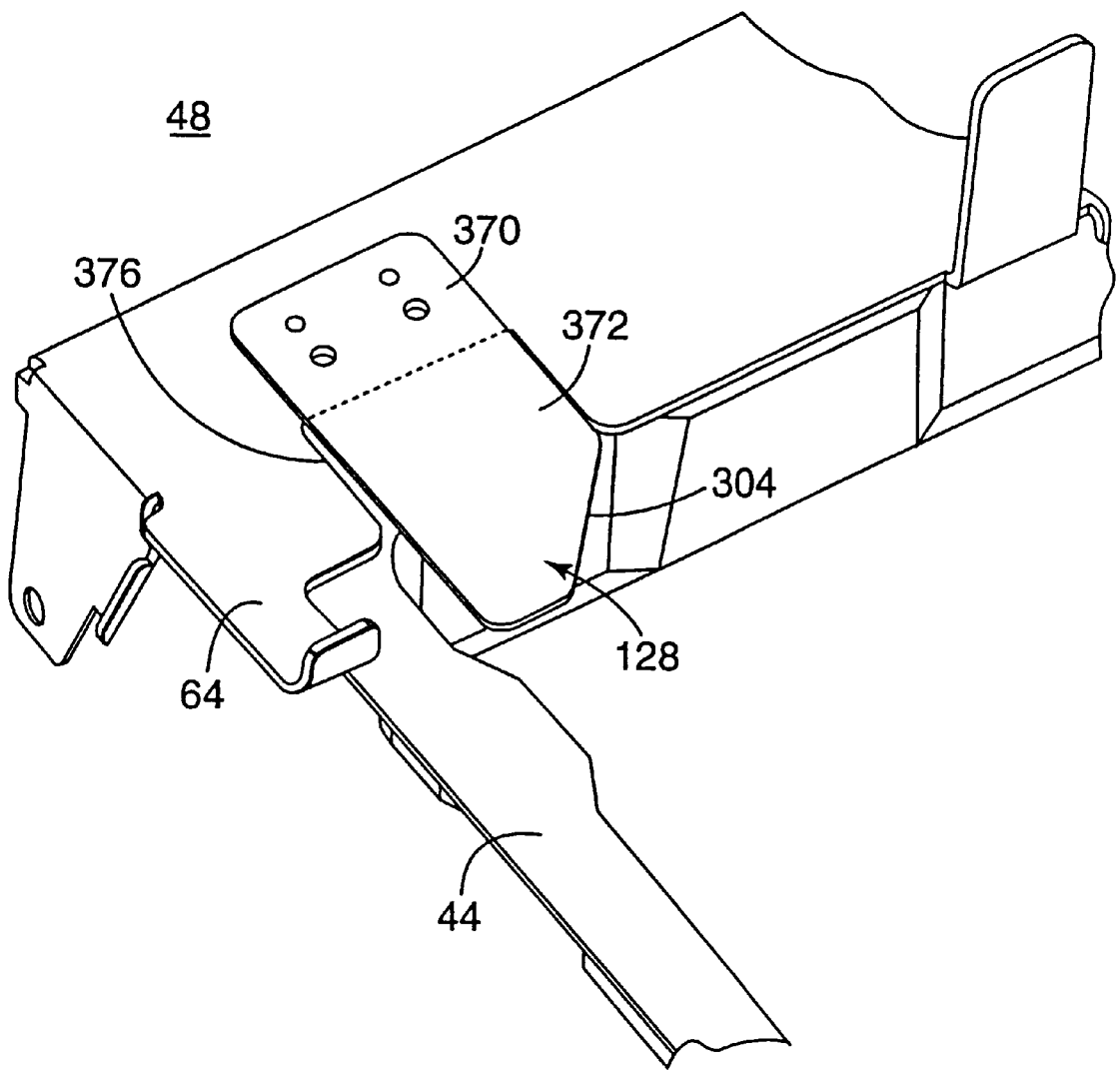
FIG. 15 is an enlarged perspective view of a portion of the cartridge receiving apparatus including a separation tab in accordance with the present invention.

Before providing a detailed recitation on system operation, one additional feature of the film pick-up mechanism 50 is shown in FIG. 15. More particularly, an enlarged view of one of the separation tabs 128 is provided. While the separation tabs 128 form a part of the preferred film pick-up mechanism 50 (FIG. 9), in one preferred embodiment, the separation tabs 128 are integrally related with the film guard 64 of the cartridge receiving apparatus 48 previously described. While only one of the separation tabs 128 is shown in FIG. 15, it should be understood that in a preferred embodiment, two of the separation tabs 128 are provided, one each at opposite sides of the film guard 64.

Each of separation tabs 128 includes an attachment end 370, an intermediate portion 372 and a beveled end 374. The attachment end 370 is configured for attachment to the film guard 64. In a preferred orientation, the intermediate portion 372, including the beveled end 374, extends from the film guard 64 and is free to move or flex relative to the attachment end 370. To facilitate flexure of the intermediate portion 372 relative to the attachment end 370, the film guard 64 preferably includes a notch 376.

As shown in FIG. 15, the separation tabs 128 have a length such that the intermediate portion 372, including the beveled end 374, extends from the film guard 64 over the film cartridge 44. In a preferred embodiment, the separation tabs 128 are made of a plastic material configured to allow flexure of the intermediate portion 372 relative to the attachment end 370.

As will be made more clear by further discussion, the separation tabs 128 are more properly described as being associated with the film pick-up mechanism 50 (FIG. 9) because the separation tabs 128 act in conjunction with the cup plate 230 (FIG. 9) to separate sheets of film (not shown).

D. Operation of the Film Supply System 34

As previously described with reference to FIG. 1, the film supply system 34 includes the cartridge receiving apparatus 48 and the film pick-up mechanism 50. For ease of illustration and understanding, operation of these components is shown in isolation in FIGS. 16–29.

Figure 16:
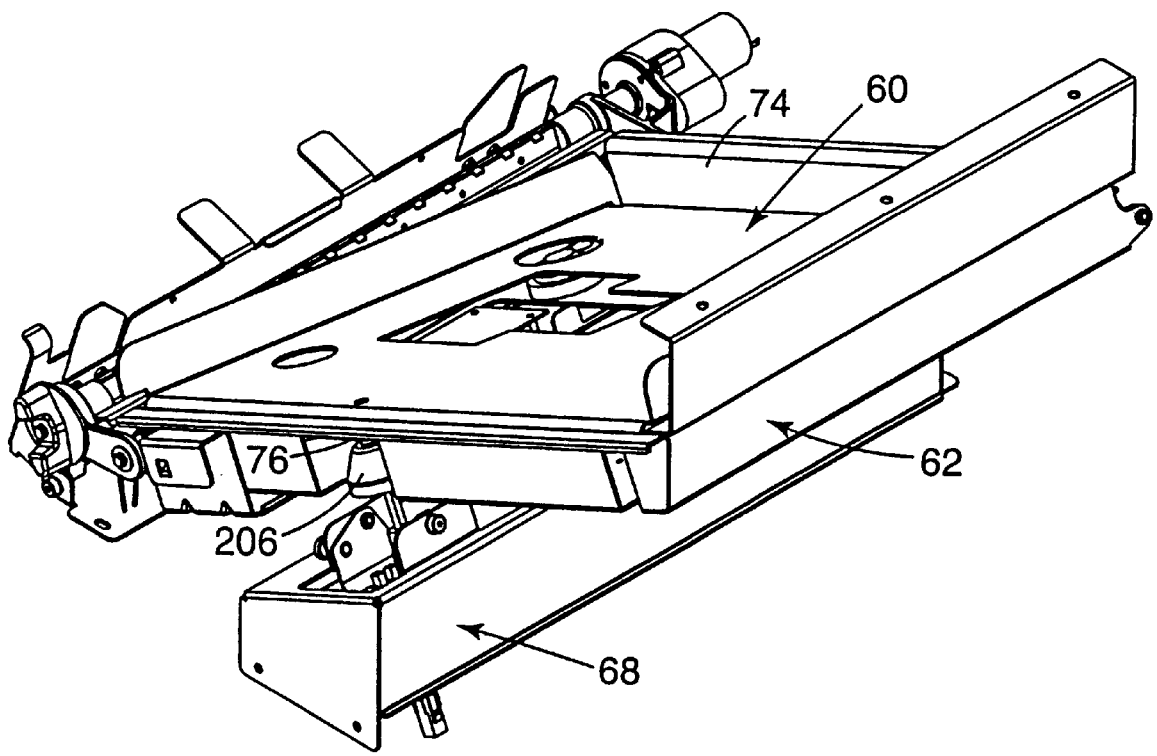
FIGS. 16–20 illustrate the steps of operating the cartridge receiving apparatus in accordance with the present invention.
Figure 17:
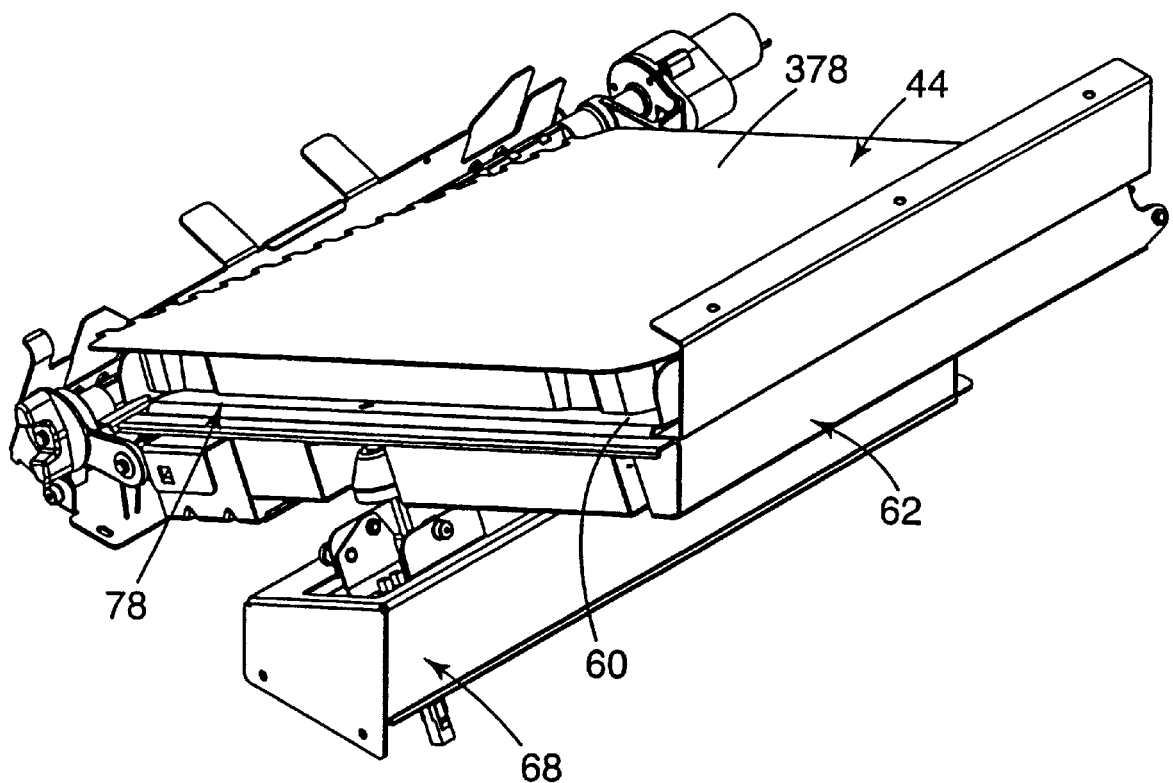

Beginning with FIG. 16, the cartridge receiving apparatus 48 is positioned to receive a film cartridge (not shown). More particularly, the elevator mechanism 68 is raised, such that the head 206 contacts the socket 76 of the tray 60. As previously described, the tray 60 is pivotably secured to the guide frame 62 at the side wall 74. Thus, in the raised position, the tray 60 angles downwardly within the guide frame 62 from the socket 76 toward the side wall 74. This angled orientation assists a user in sliding the film cartridge 44 within the tray 60, via the cartridge insertion path 78, so that the film cartridge 44 abuts the side wall 74, as shown in FIG. 17. Notably, the film cartridge 44 is shown in FIG. 17, and subsequent figures, as having a sealed, foil cover 378.

Figure 18:
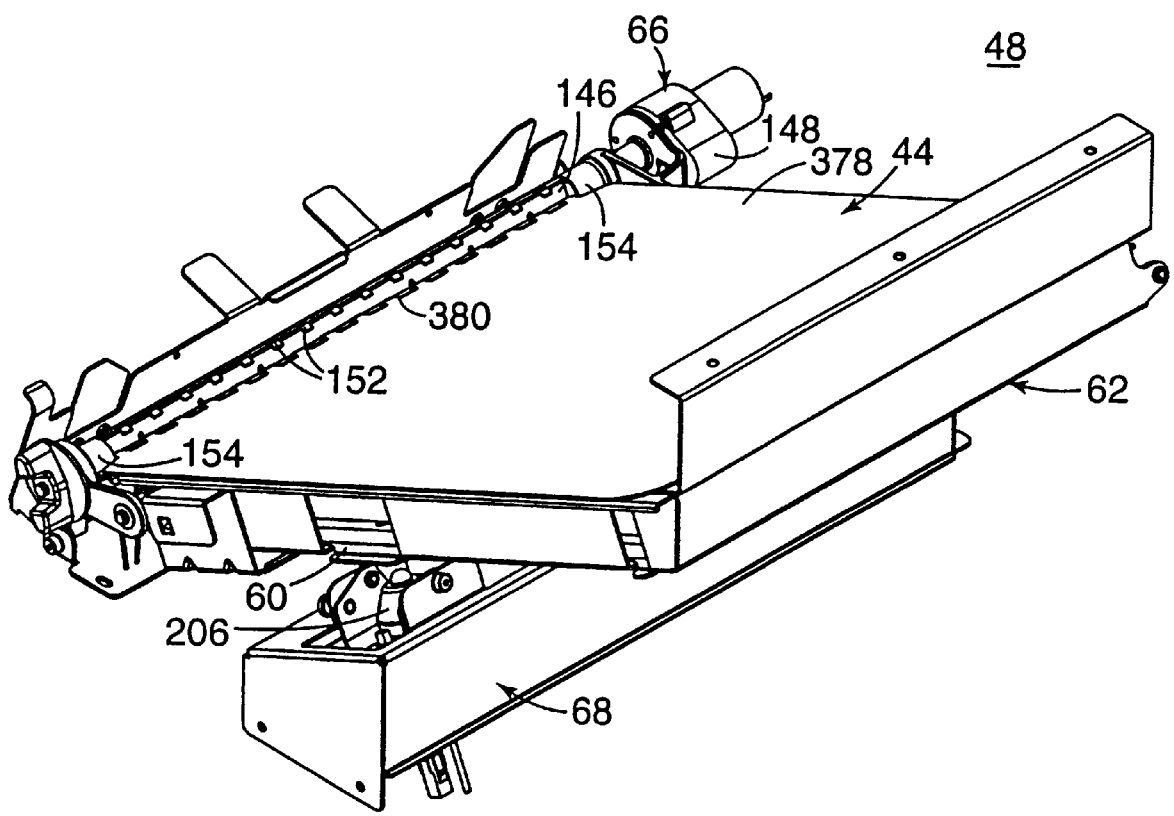

Following placement of the film cartridge 44 within the tray 60, the elevator mechanism 68 is lowered to retract the tray 60 within the guide frame 62, as shown in FIG. 18. In this retracted position, the head 206 of the elevator mechanism 68 completely disengages the socket 76 (not shown) of the tray 60. To ensure proper positioning of the film cartridge 44 relative to the guide frame 62, the aperture locators 100, 102 (FIG. 3) engage corresponding apertures (not shown) in the bottom of the film cartridge 44. Similarly, the support locators 104, 106 (FIG. 3) engage corresponding supports (not shown) in the bottom of the film cartridge 44. These locators 100–106 provide for location of the film cartridge 44 in three dimensions. Notably, the tapered configuration of the aperture locators 100, 102 facilitates engagement with the film cartridge 44.

Figure 19:
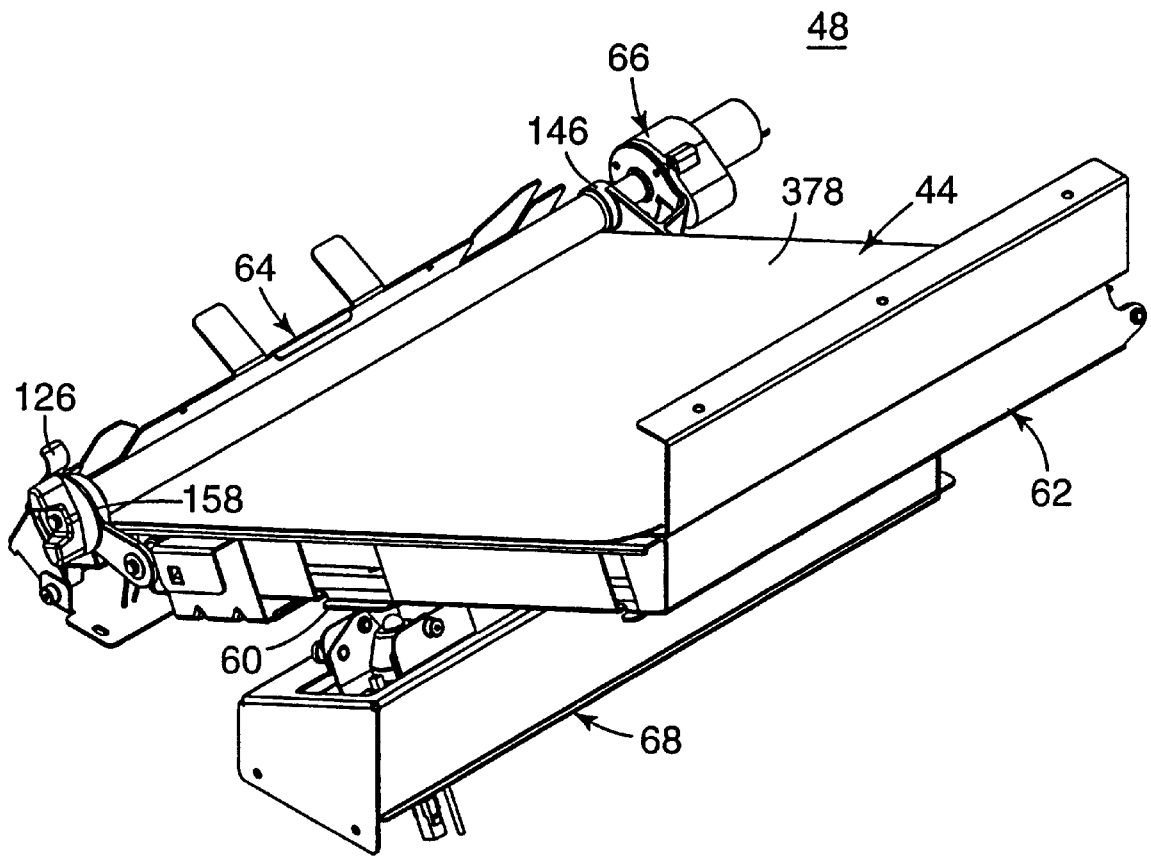

With the film cartridge 44 properly positioned within the guide frame 62, the rollback mechanism 66 is activated. In particular, a controller (not shown) activates the rollback motor 148, rotating the elongated shaft 146. The teeth 152 of the elongated shaft 146 engage a perforated leading edge 380 of the foil cover 378 of the film cartridge 44. As the elongated shaft 146 continues to rotate, the elongated shaft 146, including the opposing ends 154, engage a forward lip of the film cartridge 44. Because the foil cover 378 is sealed to the film cartridge 44, a tension or resistance to the rotational movement of the elongated shaft 146 is presented. The rollback motor 148 is sized to overcome this resistance and continues rotating the elongated shaft 146 such that the foil cover 378 wraps around the elongated shaft 146, as shown in FIG. 19.

In conjunction with the wrapping motion, as the opposing ends 154 grip a lip of the film cartridge 44, the entire rollback mechanism 66 translates along the guide frame 62. More particularly, the carriage 140 slides along the guide frame 62 as the opposing ends 154 contact the film cartridge 44. Notably, the opposing torsion springs 144 acts to maintain contact between the opposing ends 154 and the film cartridge 44.

Figure 20:
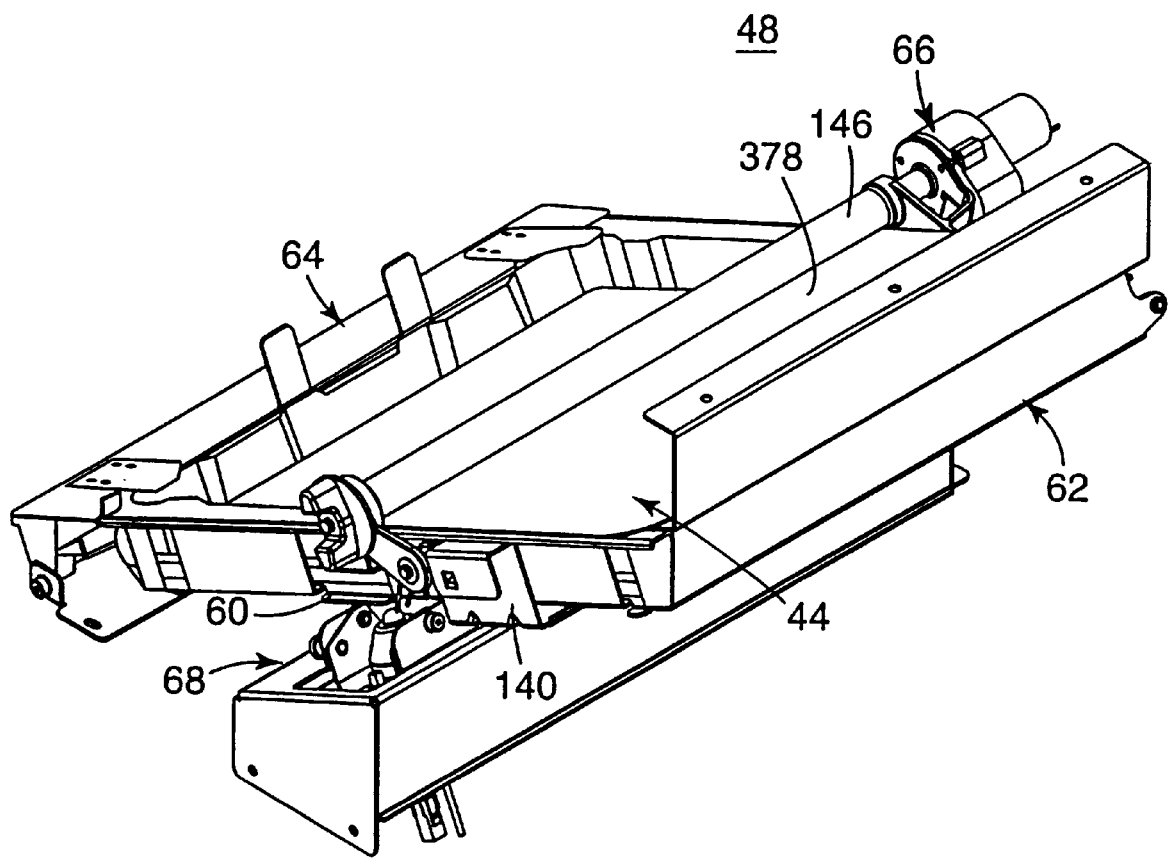

In conjunction with movement of the rollback mechanism 66 along the film cartridge 44, the film guard 64 is biased into an engagement position. As previously described, the film guard 64 is biased against the cam surface 156 of the rollback link 142a prior to activation of the rollback mechanism 66. As the rollback mechanism 66, including the elongated shaft 146, moves away from the film guard 64, the biasing means 114 (FIG. 6) biases the film guard 64 toward the film cartridge 44. In this regard, the rollback clearance tab 126 rides along the cam surface 156. Once the rollback mechanism 66 is clear of the film guard 64, the film guard 64 nests against the film cartridge 44 as shown in FIG. 20. Notably, with reference to FIG. 20, the elevator mechanism 68 retracts a sufficient distance from the tray 60 to allow passage of the carriage 140 of the rollback mechanism 66. Thus, the elevator mechanism 68 does not impede movement of the rollback mechanism 66 along an entire length of the film cartridge 44.

The rollback mechanism 66 continues along a length of the film cartridge 44, retracting/rolling the foil cover 378 of the film cartridge 44 for a predetermined time period or number of rotations of the elongated shaft 146. Alternatively, a sensor can be provided along the guide frame 62 to signal a controller (not shown) that the rollback mechanism 66 has retracted enough of the foil cover 378 so that sheets of film maintained within the film cartridge 44 can be removed.

Figure 21:
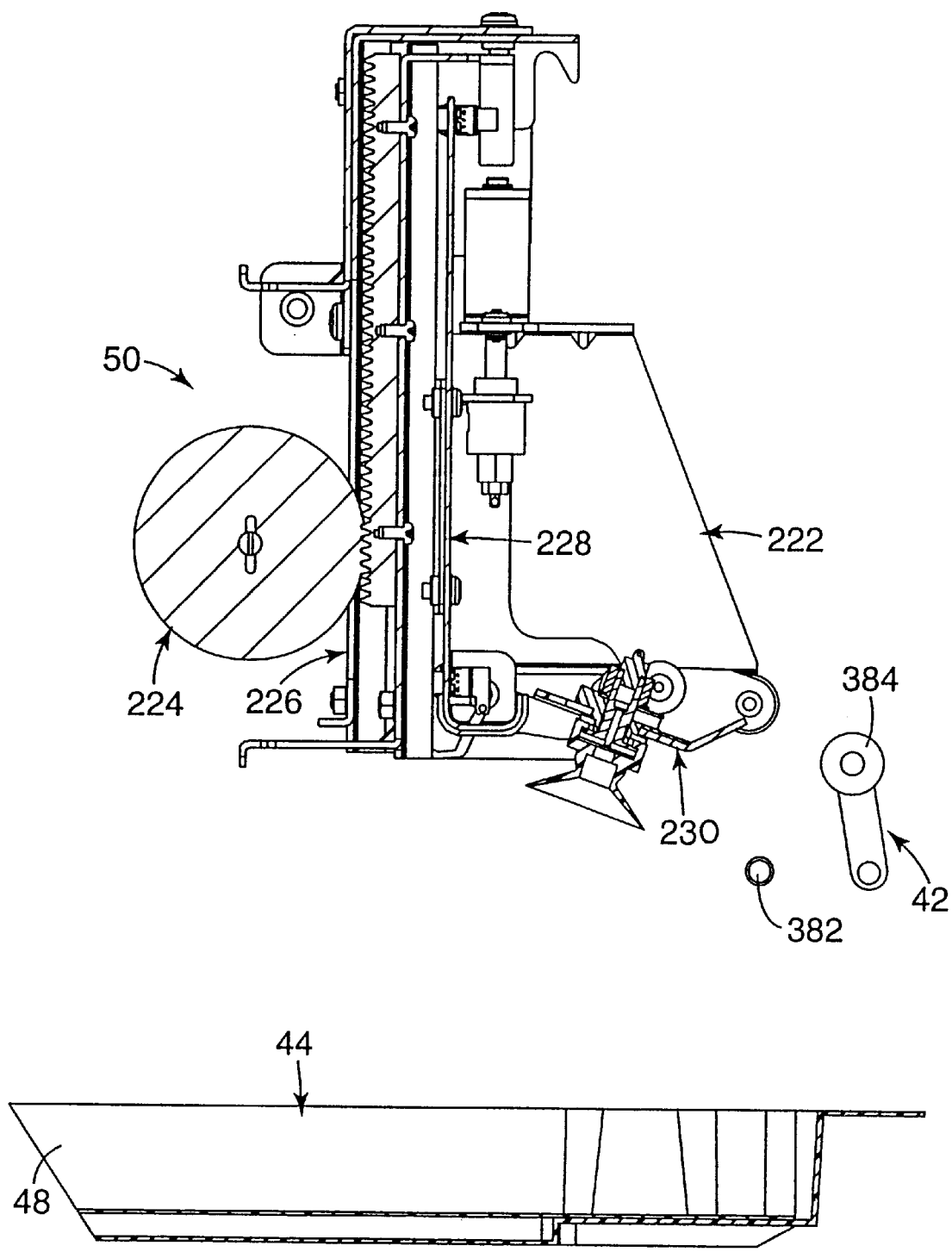
FIGS. 21–29 illustrate the steps of operating the film pick-up mechanism in accordance with the present invention.

Once a sufficient amount of the foil cover has been retracted, the film pick-up mechanism 50 is activated, as shown in FIG. 21. Notably, for ease of illustration, FIGS. 21–29 only show a portion of the cartridge receiving apparatus 48 and the film cartridge 44. Finally, FIGS. 21–29 also show a portion of the film transport system 42, including first and second feed rollers 382, 384. It should also be understood that FIGS. 21–29 show the film pick-up mechanism 50 and the cartridge receiving apparatus 48 in a substantially upright position. It will be recalled, with reference to FIG. 1, however, that in a preferred embodiment, the film pick-up mechanism 50 and the cartridge receiving apparatus 48 are preferably positioned at an angle within the imager housing 32 (FIG. 1).

Figure 22:
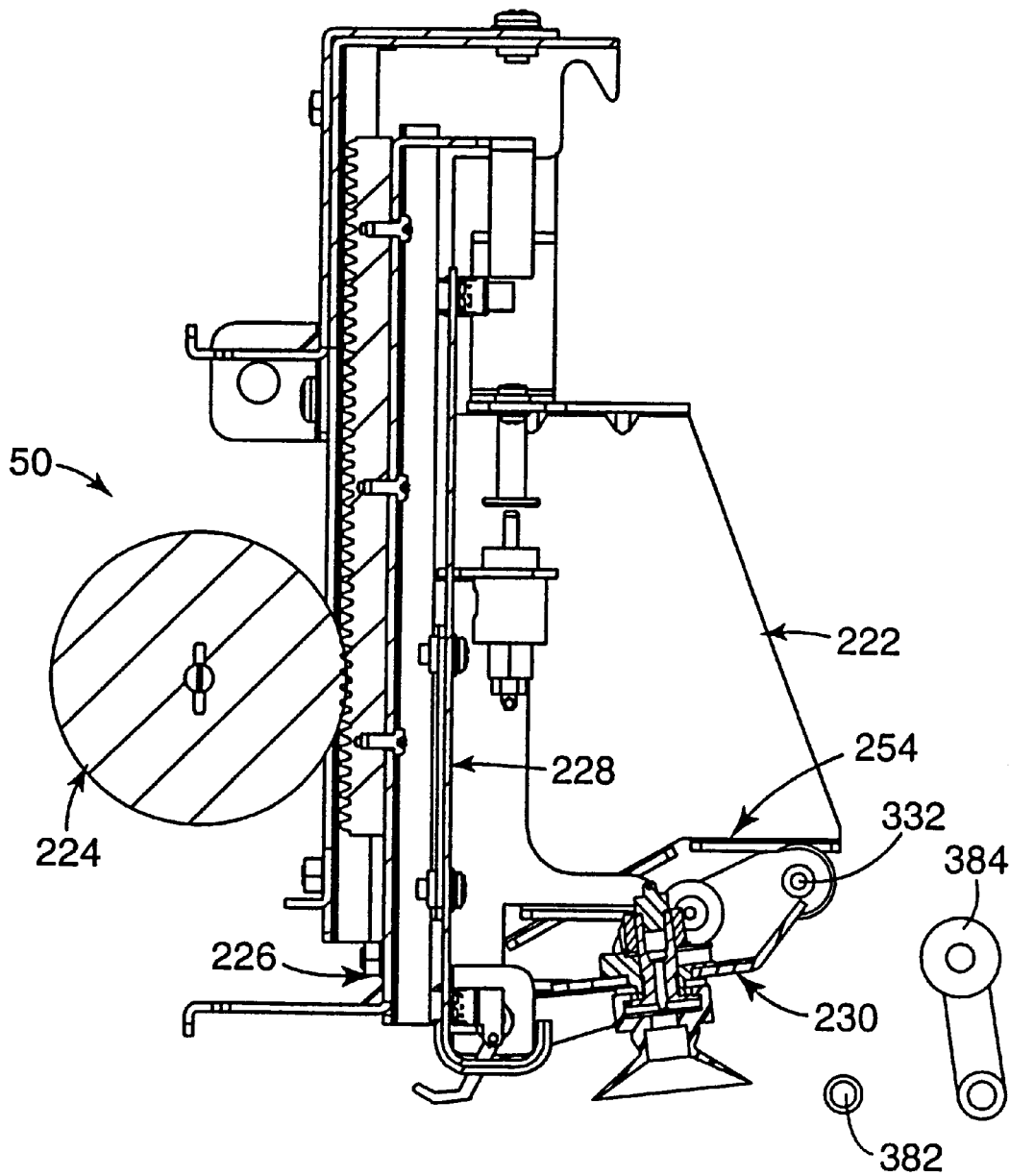
Figure 22:
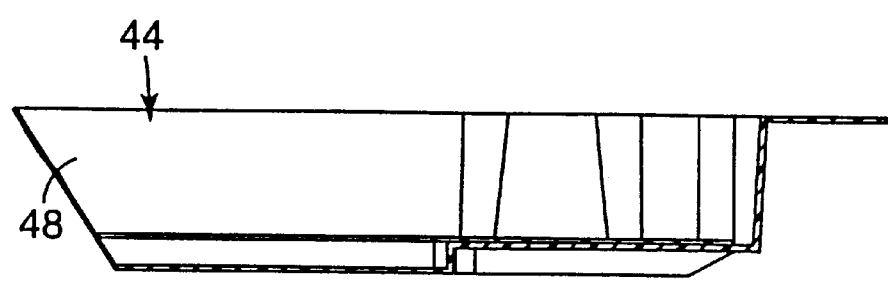

Prior to activation, the film pick-up mechanism 50 is maintained in a "home" position, shown in FIG. 21. More particularly, the drive means 224 has retracted the drive frame 226 and the heel plate 228 within the retention frame 222. Further, the cup plate 230 is positioned adjacent the retention frame 222. Upon receiving a signal indicating that the rollback mechanism 66 (FIG. 20) has ended its rollback movement, the controller (not shown) signals the drive means 224 to begin the downward stroke. As shown in FIG. 22, the drive frame 226 and the heel plate 228 extend downwardly from the retention frame 222. Further, the cup plate 230 begins to rotate upwardly relative to the drive frame 226 via biasing of the biasing means 300 (FIG. 11). Rotational movement of the cup plate 230 upwardly relative to the drive frame 226 is controlled by translation of the opposing pair of long rollers 332 along the frame shelf 254.

Figure 23:
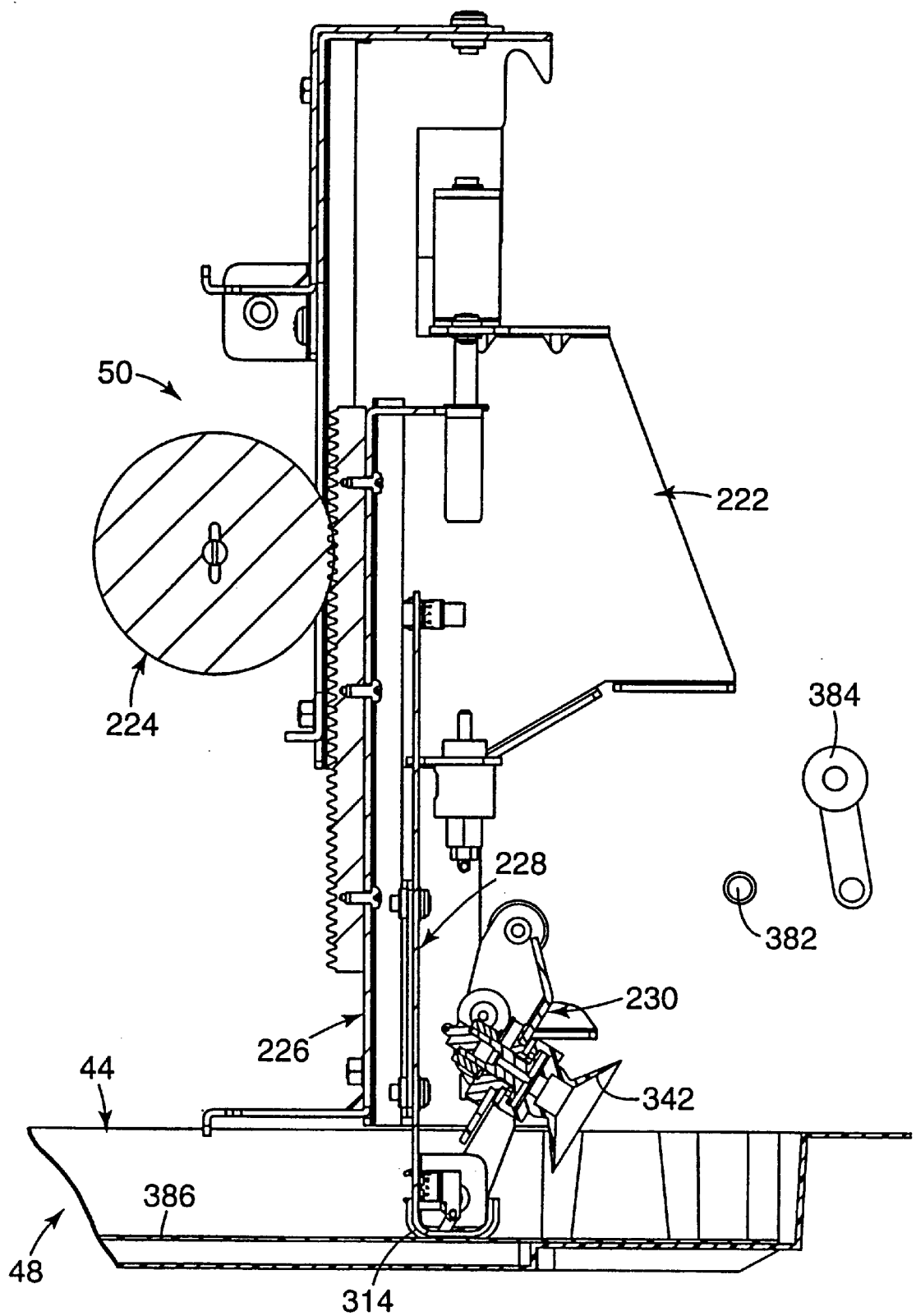

Downward movement of the drive frame 226 and the heel plate 228 continues until the film contact body 314 contacts a top sheet of film 386 maintained within the film cartridge 44, as shown in FIG. 23. Importantly, as the film pick-up mechanism 50 cycles through the downward stroke, the cup plate 230 rotates upwardly relative to the drive frame 226 such that the suction cups 342 do not contact the top sheet of film 386 prior to the film contact body 314. In other words, the film contact body 314 of the heel plate 228 is the first component of the film pick-up mechanism 50 to contact the top sheet of film 386.

This preferred feature of the film pick-up mechanism 50 is important to avoid undesired engagement of the suction cups 342 with a bottom sheet of film or a liner otherwise disposed at a bottom of the film cartridge 44. The standard film cartridge 44 normally includes a stack of film, with the last or bottom sheet of film, or bottom liner, having an opening designed to alert a user that the film cartridge 44 is empty. Recognizing this inherent design feature, the heel plate 228 includes the first and second film sensors 318a and 318b (FIG. 9). The second film sensor 318b is preferably positioned along the film contact body 314 such that as the film contact body 314 enters the film cartridge 44, the second film sensor 318b is aligned with the above-described opening.

As the film pick-up mechanism 50 proceeds through its downward stroke, the first film sensor 318a (FIG. 9) will be activated upon contact with the top sheet of film 386, if any film is in the film cartridge 44, or with the bottom sheet or liner of the film cartridge 44. Upon contact, the first film sensor 318a sends a signal to the controller (not shown) indicating that the film contact body 314 is about to contact the top sheet of film 386, or the bottom sheet or liner within the film cartridge 44. At this exact moment, the controller determines the status of the second film sensor 318b. If the second film sensor 318b is also indicating contact, the controller determines that at least one sheet of acceptable film is within the film cartridge 44 and continues cycling. However, if the second film sensor 318b is not activated, because the second film sensor 318b has proceeded through an opening in the bottom sheet or liner in the film cartridge 44, the controller returns the film pick-up mechanism 50 to the home position, and provides a signal to an operator that the film cartridge 44 is empty.

Figure 24:
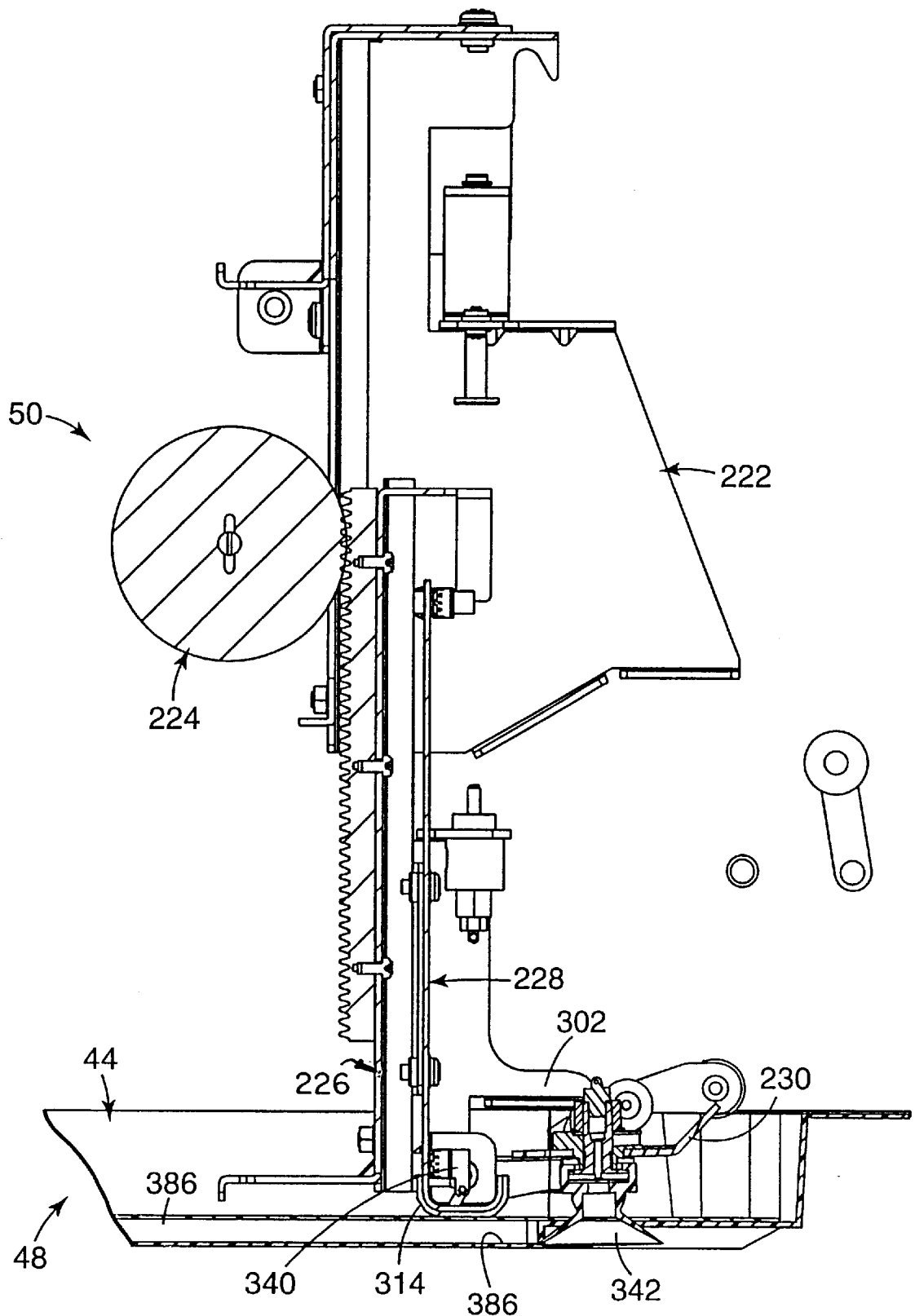

Assuming that at least one acceptable sheet of film is present in the film cartridge 44, such as the top sheet of film 386 as shown in FIGS. 21–29, the drive means 224 continues through the downward stroke. As shown in FIG. 24, upon contact of the film contact body 314 with the top sheet of film 386, downward movement of the heel plate 228 is basically stopped. However, because the heel plate 228 is slidably received within the drive frame 226, continuation of the downward stroke forces the driver frame 226 downward relative to the film cartridge 44. In other words, the heel plate 228 remains stationary while the drive frame 226 continues downward, sliding relative to the heel plate 228.

Downward movement of the drive frame 226 translates a force onto the cup plate 230 via interaction of the opposing pair of short rollers 330 (FIG. 9) within the respective slots 302 of the drive frame 226, causing the cup plate 230 to pivot relative to the heel plate 228 at the pivot point 340. Thus, continued downward motion of the drive frame 226 following contact of the heel plate 228 with the top sheet of film 386 causes the cup plate 230 to rotate until the suction cups 342 engage the top sheet of film 386. The top sheet of film 386 is secured to the suction cups 342 by a positive vacuum so that an external vacuum source is not required. However, where additional suction is desired, an external source can be provided.

The downward stroke of the drive means 224 is stopped when the controller (not shown) receives an appropriate signal from the cup engage sensor 316 (FIG. 9). As previously described, once the film contact body 314 of the heel plate 228 contacts the top sheet of film 386, the heel plate 228 no longer moves downwardly. However, the drive frame 226 continues its downward motion, sliding relative to the heel plate 228. At a certain point during this sliding motion, the cup engage sensor 316 will sense the presence of the sensor tab 304 (FIG. 9) otherwise associated with the drive frame 226. The distance between the cup engage sensor 316 and a leading edge of the sensor tab 304 is predetermined such that the sensor tab 304 engages the cup engage sensor 316 at a position whereby the cup plate 230 is fully rotated into the cup down position and the suction cups 342 contact the top sheet of film 386. Upon receiving a signal from the cup engage sensor 316 that the sensor tab 304 has been engaged, the controller then stops the downward stroke of the drive means 224. With this configuration then, the film pick-up mechanism 50 of the present invention accounts for different stack heights of film within the film cartridge 44 as the downward stroke will continue until a signal is received from the cup engage sensor 316.

Once the downward stroke of the drive means 224 has ended, the upward stroke is initiated. During the initial stages of the upward stroke, the drive frame 226 moves upwardly while the heel plate 228 remains stationary relative to the top sheet of film 386. This stationary positioning of the heel plate 228 is dictated by the biasing means 300 (FIG. 9), which forces the heel plate 228 away from the drive frame 226. While the heel plate 228 remains stationary, upward motion of the drive frame 226 allows the cup plate 230 to rotate about the pivot point 340, toward the heel plate 228. This preferred rotational movement is accomplished by the previously described rotational biasing of the cup plate 230 upwardly relative to the heel plate 228 via the biasing means 300. Further, the opposing pair of short rollers 330 (FIG. 9) are allowed to translate through the slots 302 of the drive frame 226.

Importantly, with additional reference to FIG. 11, the cup plate 230 is configured to allow slight movement of the suction cups 342 relative to the base 326 during the upward stroke. It should be remembered that as the cup plate 230 rotates upward to the maximum bend position, the film contact body 314 remains stationary. Thus, the portion of the top sheet of film 386 engaged by the film contact body 314 also does not move. As the cup plate 230 rotates, the portion of the top sheet of film 386 attached to the suction cups 342 pulls away from the portion engaged by the film contact body 314. If the suction cups 342 were permanently secured to the cup plate 230, the suction cups 342 would deform, lose suction and fail to retain the top sheet of film 386. Instead, however, the suction cups 342 are allowed to slide within the slots 338 of the cup plate 230 so that the cup plate 230 can fully rotate without breaking the vacuum contact with the top sheet of film 386.

Figure 25:
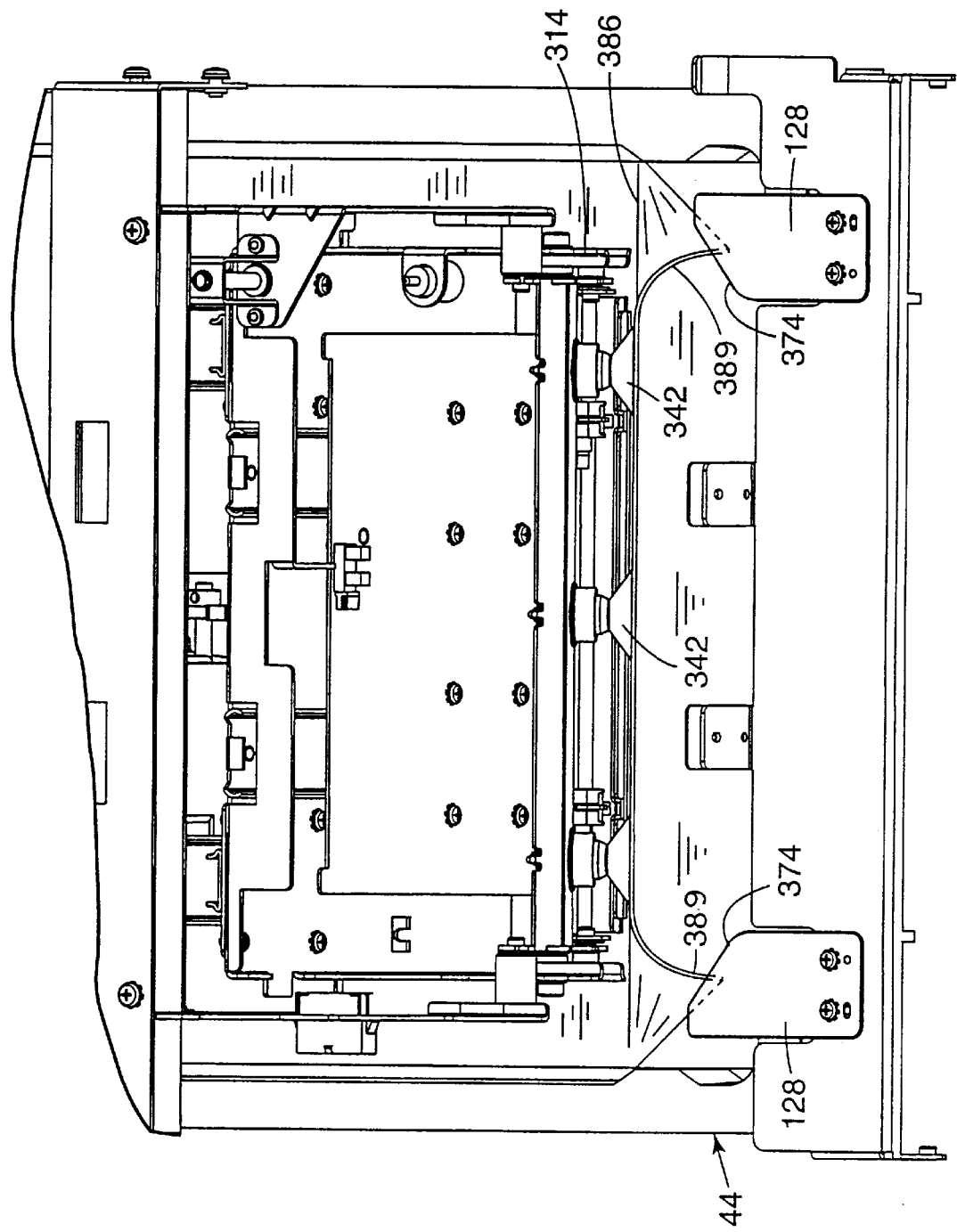

As shown in FIG. 25, which is a top view into the film cartridge 44, once upward motion of the drive frame 226 is sufficient so that the cup plate 230 is fully retracted (the maximum bend position), a compound bend is formed in the top sheet of film 386. More particularly, the top sheet of film 386 bends upwardly from the film contact body 314 to the suction cups 342; and bends downwardly from the suction cups 342 to the separation tabs 128. Thus, in the preferred embodiment, the top sheet of film 386 is maintained by the separation tabs 128. Additionally, due to the beveled section 374 of the separation tabs 128, the top sheet of film 386 bends inwardly at corners 389 along the beveled section 374, in a bend plane different from the bend plane generated by the film contact body 314 and the suction cups 342. Thus, in one preferred embodiment, a compound bend in the top sheet of film 386 is formed.

In a preferred embodiment, the film pick-up mechanism 50 is configured such that the cup plate 230 rotates approximately 55° from horizontal in the maximum bend position. Thus, the top sheet of film 386 bends at approximately a 55° angle from the film contact body 314 to the suction cups 342.

Figure 26:
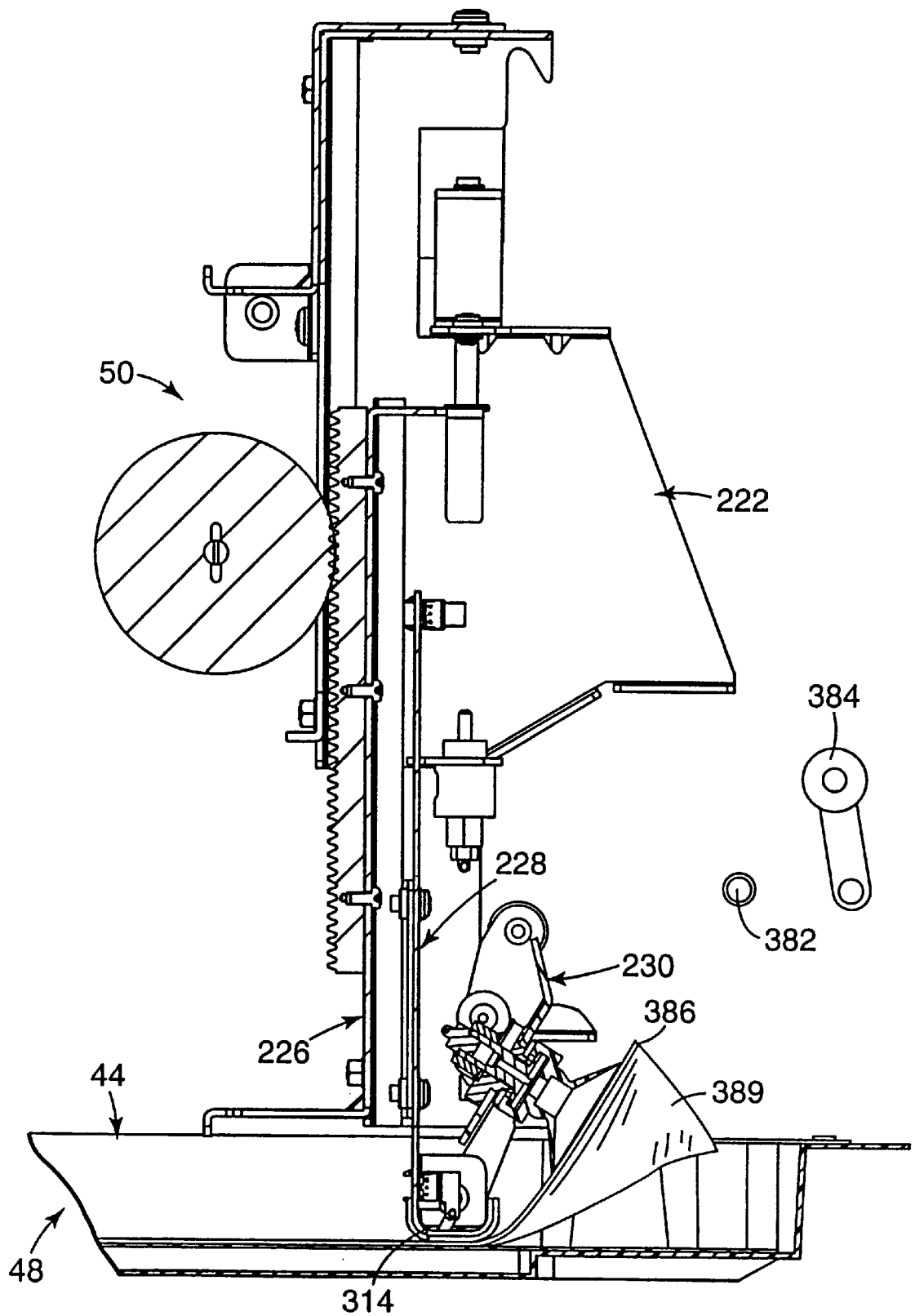

The bend in the top sheet of film 386 creates a separation force between the top sheet of film 386 and other sheets of film which may otherwise be adhered to the top sheet of film 386, because a beam strength of the film resists bending. When the separation force exceeds an interface force sticking the sheets together, the top sheet of film 386 separates from the remaining sheets of film. Obviously, the greater the bending action and the longer the sheets are held under bending, the more likely the sheets will separate. The compound bend created in the top sheet of film 386 from the suction cup 342 to the separation tabs 128 provides additional film bending, or bowing, that enhances film separation. In this regard, the separation tabs 128 are preferably provided with the beveled end 374 to impart a transverse bowing into the top sheet of film 386. To ensure separation between the top sheet of film 386 and other sheets of film, the drive means 224 pauses at the maximum bend position shown in FIG. 25 for approximately three seconds. This pause ensures that only the top sheet of film 386 remains attached to the suction cups 342, as shown in FIG. 26.

Figure 27:
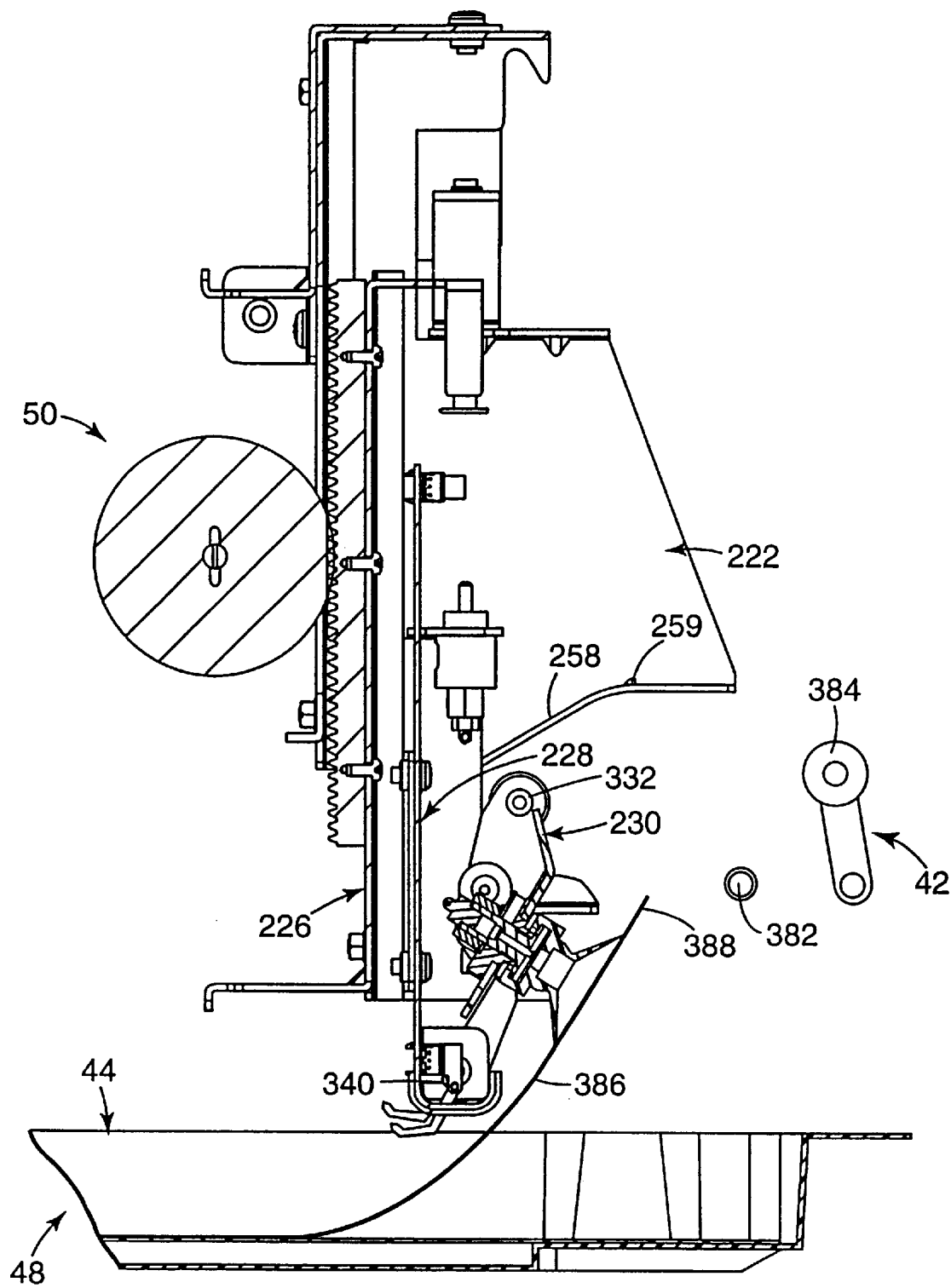

Following film separation, the upward stroke of the drive means 224 continues, causing the drive frame 226 and the heel plate 228 to move upward. Notably, the cup plate 230 remains in the maximum bend position relative to the drive frame 226 such that as the drive frame 226, the heel plate 228 and the cup plate 230 move upwardly, a leading edge 388 of the top sheet of film 386 clears the first feed roller 382, as shown in FIG. 27. In other words, due to rotational retraction of the cup plate 230 to the maximum bend position, the top layer of film 386 will not accidentally contact first feed roller 382. Effectively then, rotation of the cup plate 230 serves two purposes with one motion. First, rotation of the cup plate 230 accomplishes necessary film separation. Second, following rotation, the leading end 388 of the top sheet of film 386 is properly positioned to clear the first feed roller 382.

Figure 28:
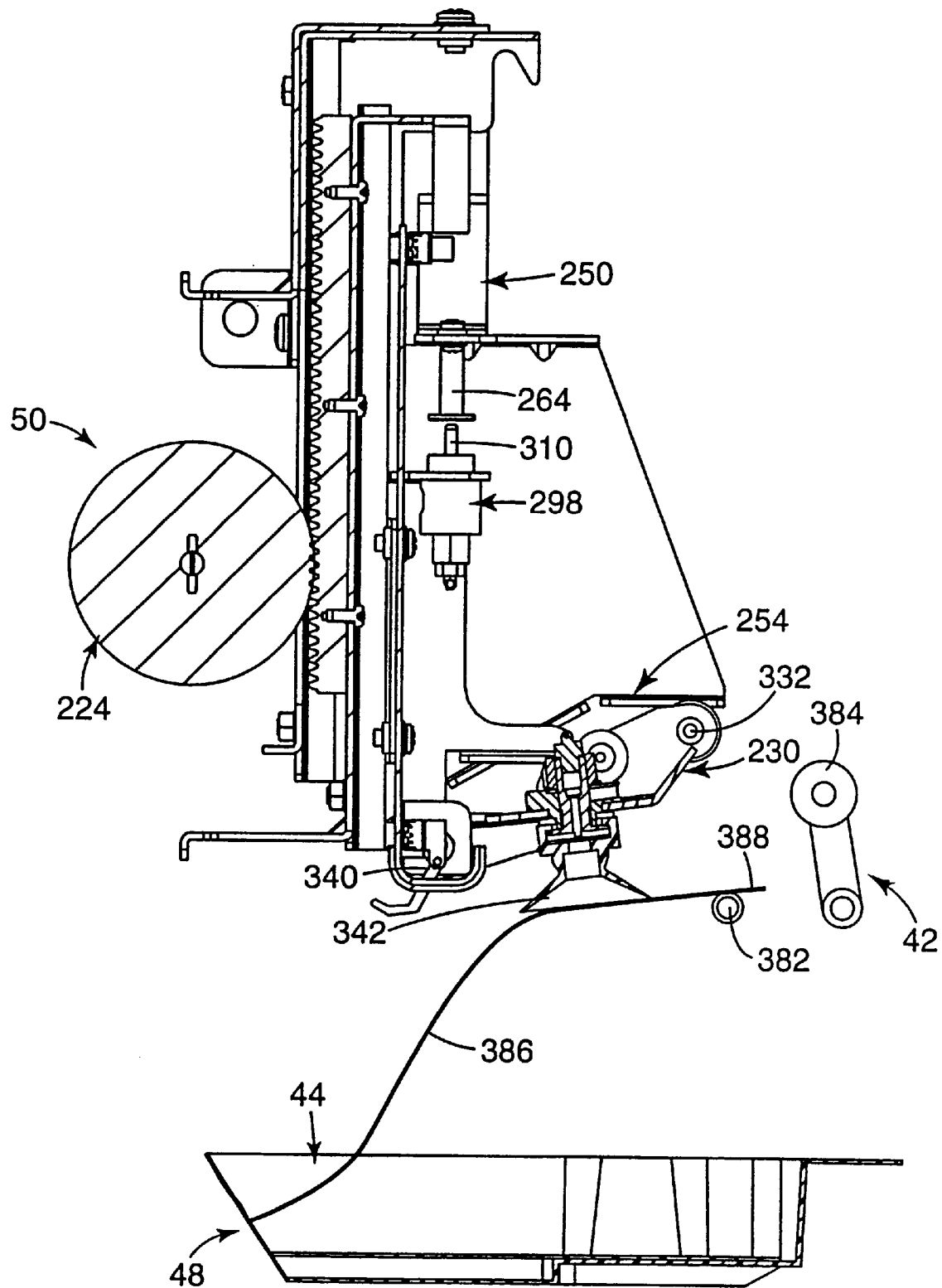

As the upward stroke continues, the opposing pair of long rollers 332 contact the angled section 258 of the frame shelf 254. Interaction between these components forces the cup plate 230 to rotate at the hinge point 340 from the maximum bend position to the cup down position as the opposing pair of long rollers 332 translate along the frame shelf 254. Rotation of the cup plate 230 via the frame shelf 254 positions the leading end 388 of the top sheet of film 386 between the first and second feed rollers 382, 384 as shown in FIG. 28. Additionally, as the cup plate 230 rotates, the suction cups 342 slide within the slots 338 (FIG. 12) in the cup plate 230 to move the leading end 388 toward the feed rollers 382, 384.

Once the upward stroke of the film pickup mechanism 50 reaches the film delivery position shown in FIG. 28, the controller (not shown) is signalled to close the film transport system 42. More particularly, the first and second feed rollers 382, 384 are driven closed to secure the top sheet of film 386. The film delivery position is signalled to the controller via the driver sensor 248 (FIG. 9). With reference to FIG. 9, as the drive frame 226 slides upwardly within the retention frame 222, the drive positioning tab 301 passes into the driver sensor 248. In this regard, the driver sensor 248 and the drive positioning tab 301 are specifically arranged such that the drive positioning tab 301 first contacts the driver sensor 248 when the cup plate 230 has been translated to the position shown in FIG. 28. Upon receiving a signal from the driver sensor 248, the controller activates the film transport system 42 such that the top sheet of film 386 is secured or pinched between the first and second feed rollers 382, 384.

As the upward stroke continues, the pressure relief valve 298 contacts the plunger 250. As previously described, the pressure relief valve 298 is fluidly connected to the suction cups 342 so that a passive vacuum is created between the suction cups 342 and the top layer of film 386. As the stem 310 (FIG. 9) of the pressure relief valve 298 contacts the shaft 264 of the plunger 250, fluid within the pressure relief valve 298 is released, disengaging the top sheet of film 386 from the suction cups 342.

Figure 29:
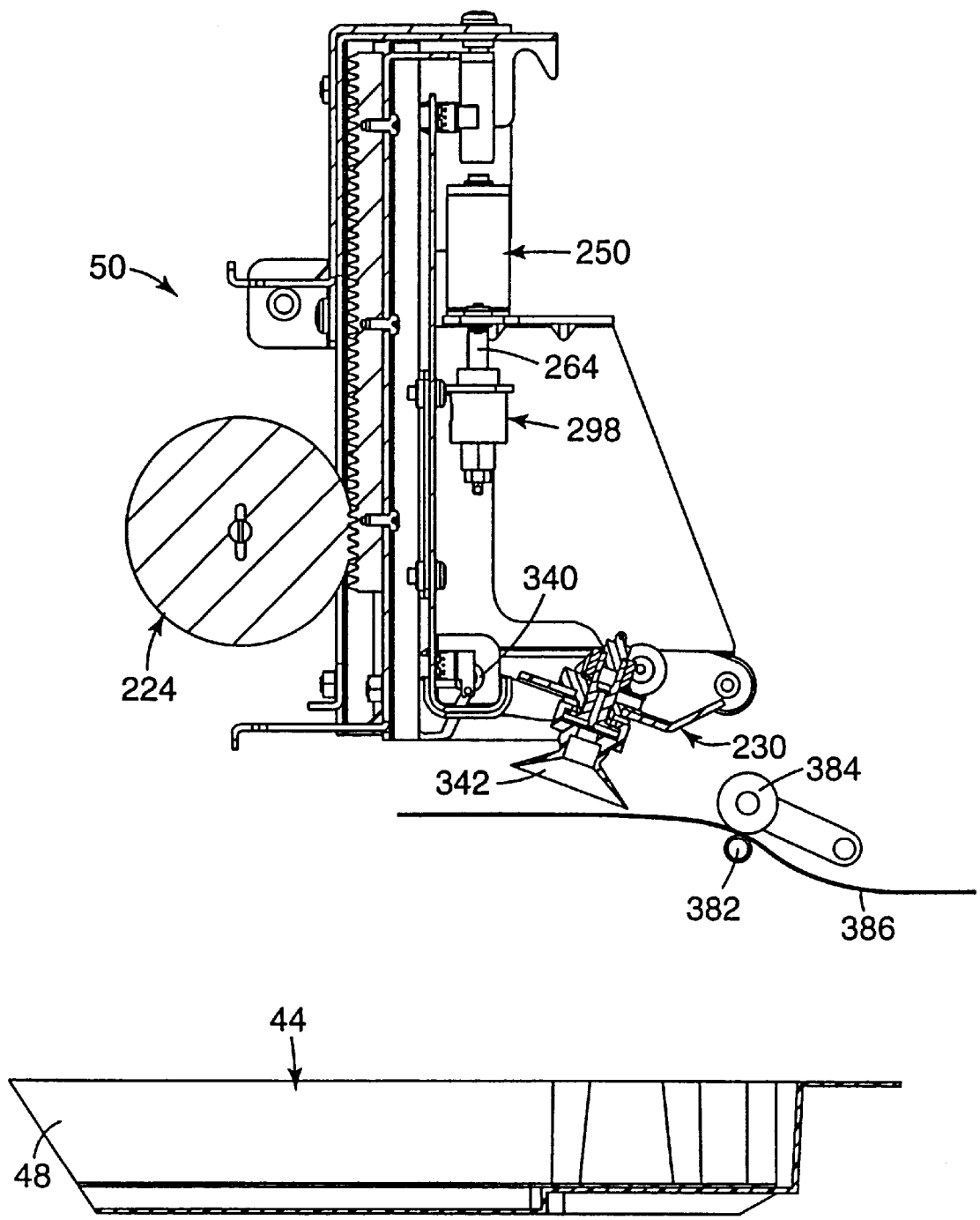

Although the top sheet of film 386 has been released, the upward stroke of the drive means 224 continues, with the cup plate 230 rotating at the hinge point 340 to the cup extended position via interaction of the opposing pair of long rollers 332 with the frame shelf 254, as shown in FIG. 29. Notably, because the plunger 250 is spring loaded, it did not present a hard stop to the pressure relief valve 298. In other words, upward motion of the drive frame 226 following contact between the pressure relief valve 298 and the plunger 250 is not impeded as the spring 266 (FIG. 9) allows some degree of further travel.

Once the film pick-up mechanism 50 is in the home position, the controller (not shown) is signalled by the driver sensor 248 (FIG. 9) to activate the film transport system 42. With reference again to FIG. 9, the drive positioning tab 301 is sized so that as the drive frame 226 continues upward relative to the retention frame 222, the tab 301 will pass entirely through the driver sensor 248. In this regard, once the drive positioning tab 301 clears the driver sensor 248, the driver sensor 248 delivers a representative signal to the controller, indicating that the film pick-up mechanism 50 has reached the home position. Upon receiving this signal, the controller deactivates the drive means 224, and activates the film transport system 42 to drive the top sheet of film 386 from the film cartridge 44.

The above-described process is repeated as additional sheets of film are called for by the imager 30 (FIG. 1). As previously described, the film pick-up mechanism 50 will continue the film retrieval, separation and delivery cycling until it is determined that the film cartridge 44 is empty. Once the empty, the cartridge receiving apparatus 48 is activated to unroll the foil cover 378 (FIG. 18) for subsequent removal by an operator.

The film supply system of the present invention provides a marked improvement over previous designs. In this regard, both the cartridge receiving apparatus and the film pick-up mechanism present unique features. The cartridge receiving apparatus reduces overall size requirements for the imager housing by maintaining a film cartridge in an angular orientation, as opposed to horizontal, within the imager housing. Additionally, by providing a film cartridge insertion in a plane normal to the subsequent film travel path, the cartridge receiving apparatus of the present invention eliminates the need for two access points in the imager housing. Finally, the unique construction and operation of the cartridge receiving apparatus of the present invention meets all the requirements for use within an imager, such as maintaining and opening a film cartridge, but with a reduction in parts and therefore costs.

Similarly, the film pick-up mechanism consistently separates and delivers sheets of film with a single device. The film pick-up mechanism utilizes a novel approach whereby a rotatable cup plate and separation tabs combine to separate sheets of film. Further, the unique combination of a retention frame, drive frame, heel plate and cup plate results in a singularly associated device which achieves film delivery to the transport system with minimal parts, and therefore costs, by translating the film sheets through a straightforward camming movement.

Figure 30:
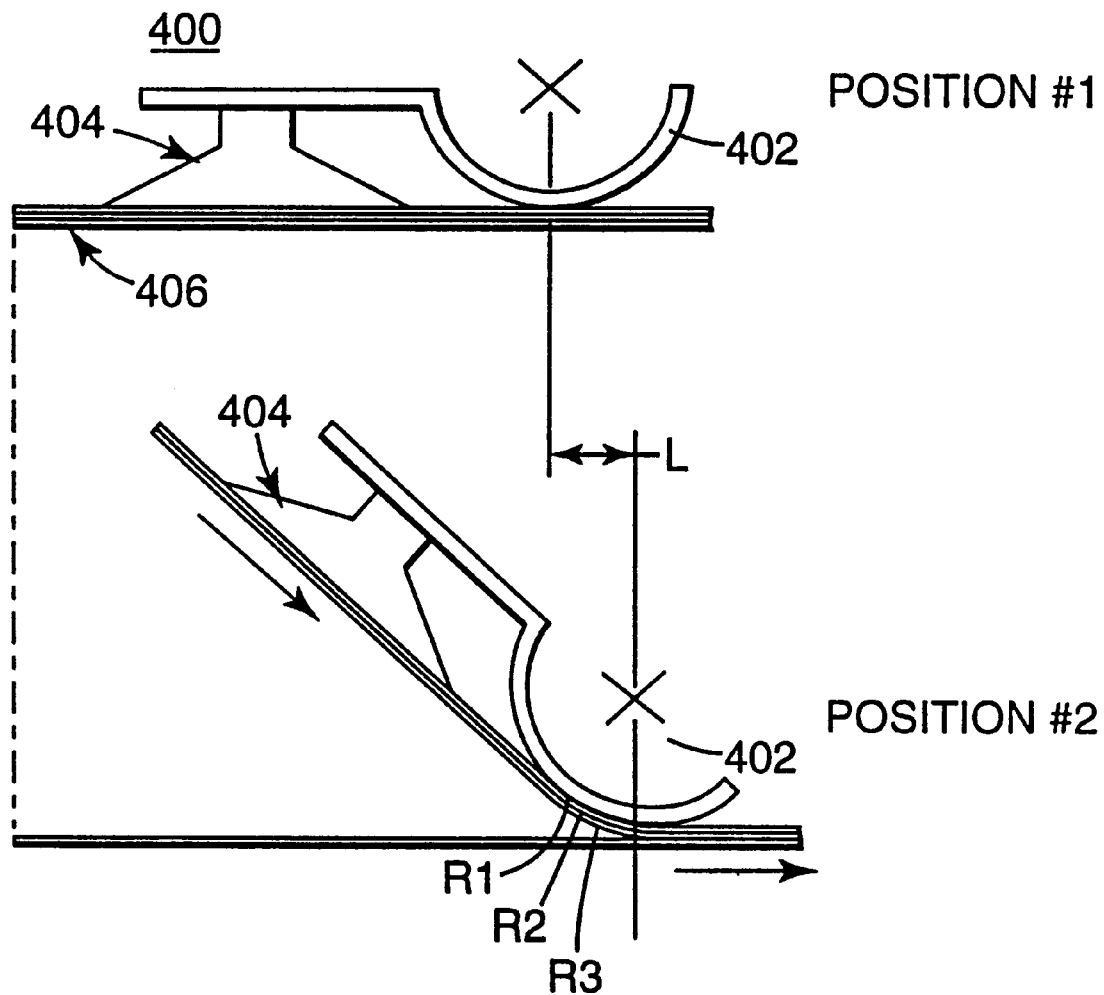
FIG. 30 is a schematic view of a portion of an alternative film pick-up mechanism in accordance with the present invention.

It will be understood that this disclosure, in many respects, is only illustrative. Changes may be made in details, particularly in matters of shape, size, material, and arrangement of parts without exceeding the scope of the invention. Accordingly, the scope of the invention is as defined in the language of the appended claims. For example, film separation can be achieved without the preferred separation tabs. Even further, the cup plate can be configured to separate sheets of film through a rotational motion. As shown in FIG. 30, an alternative cup plate 400 can include a curved heel 402 and suction cups 404 (one of which is shown in FIG. 30) for separating sheets of film 406. By rotating the cup plate 400 from position 1 to position 2, a single sheet of film will remain attached to the suction cups 404. The curved heel 402 is slid or "rolled" along the surface of the top sheet of film 406, resulting in an offset L. The offset distance L is equal to the arc length of the curved heel 402. Rotation of the curved heel 402 creates a spring force in the sheets of film 406. When this spring force is greater than the interface force between sheets of film 406, separation results. Additionally, the effective increase in radius (R1, R2, R3) with subsequent sheets of film will create a relative motion to the left (with the orientation shown in FIG. 30) on the axis of rotation as shown at position 2. This relative motion will assist in separating sheets of film.

What is claimed is:

1. A mechanism for use in an imager to separate sheets of photosensitive film from a film cartridge and deliver individual sheets of photosensitive film to a film transport system, the mechanism comprising:
   a retention frame configured for attachment within an imager;
   a drive frame slidably mounted within the retention frame;
   drive means for moving the drive frame relative to the retention frame;
   a heel plate extending from the drive frame opposite the retention frame; and
   a cup plate pivotably attached to the heel plate, the cup plate including a suction cup for selectively engaging a sheet of photosensitive film and a first drive arm for directing pivoting movement of the cup plate relative to the heel plate.

2. The mechanism of claim 1, further comprising:
   biasing means for rotatably biasing the cup plate upwardly relative to the heel plate.

3. The mechanism of claim 1, wherein the suction cup is configured to provide passive vacuum pressure upon contact with a sheet of film.

4. The mechanism of claim 3, further comprising:
   a pressure relief valve associated with the drive frame; and
   a tube fluidly connecting the suction cup to the pressure relief valve such that the pressure relief valve selectively releases vacuum pressure in the suction cup.

5. The mechanism of claim 4, wherein the retention frame includes a plunger positioned to contact the pressure relief valve during the upward stroke.

6. The mechanism of claim 5, wherein the plunger is spring loaded.

7. The mechanism of claim 1, wherein the drive means is configured to move the drive frame from a first, raised position to a second, lowered position relative to the retention frame in a downward stroke, and from the lowered position to the raised position in an upward stroke.

8. The mechanism of claim 7, wherein the cup includes a body forming a slot sized to slidably receive a portion of the suction cup, the slot being orientated substantially perpendicular to an axis of the suction cup, and a biasing means for biasing the suction cup within the slot.

9. The mechanism of claim 7, further comprising:
   a housing for maintaining sheets of film, including a separation tab associated with the cup plate in the lowered position, the separation tab being configured to contact a sheet of film engaged by the suction cup during the upward stroke.

10. The mechanism of claim 9, wherein the housing forms a cartridge receiving container for maintaining a cartridge of film.

11. The mechanism of claim 7, wherein the drive means includes a rack attached to the drive frame and a motor driven pinion associated with the retention frame.

12. The mechanism of claim 7, wherein the cup plate further includes a pivot arm configured for pivotable attachment to the heel plate.

13. The mechanism of claim 7, wherein the first drive arm is configured to direct the cup plate to pivot relative to the heel plate between a first, cup down position and a second, film bend position.

14. The mechanism of claim 13, wherein the first drive arm extends from a body of the cup plate and further including a roller attached at an end of the first drive arm opposite the body.

15. The mechanism of claim 14, wherein the drive frame includes a slot sized to receive the roller of the first drive arm, the slot being configured to translate a force from the drive frame to the roller.

16. The mechanism of claim 7, wherein the cup plate further includes a second drive arm for directing movement of the cup plate in the raised position of the drive frame.

17. The mechanism of claim 16, wherein the second drive arm is configured to direct the cup plate to pivot relative to the heel plate between a first, substantially vertical position when the drive frame is in the lowered position, and a second, substantially horizontal position when the drive frame is in the raised position.

18. The mechanism of claim 17, wherein the second drive arm extends from a body of the cup plate and further including a roller attached at an end of the second drive arm opposite the body.

19. The mechanism of claim 18, wherein the retention frame includes a shelf positioned to abut the roller in the raised position of the drive frame.

20. The mechanism of claim 7, further comprising:
   a controller for controlling movement of the drive means.

21. The mechanism of claim 20, further comprising:
   a cup engage sensor associated with the drive frame for sensing a rotational position of the cup plate relative to the drive frame.

22. The apparatus of claim 21, wherein the cup sensor is configured to provide a signal to the controller indicative of the rotational position of the cup plate.

23. The apparatus of claim 20, further comprising:
   a film sensor associated with the heel plate for sensing presence of film within a film containing housing associated with the film pick-up mechanism and providing a signal to the controller indicative thereof.

24. A method of retrieving sheets of photosensitive film from a stack of film within an imager, the method including:
   providing a film pick-up mechanism within an imager, the film pick-up mechanism including a heel plate pivotably connected to a cup plate having a suction cup;
   placing a stack of photosensitive film within a film tray disposed within the imager such that the stack of film is maintained below the film pick-up mechanism;
   moving the heel plate toward the stack of film such that the heel plate contacts a top sheet of film;
   securing the suction cup to the top sheet of film;
   bending the top sheet of film to separate the top sheet of film from other sheets in the stack of film;
   delivering the top sheet of film to a film transport system;
   wherein bending the top sheet of film includes imparting a bend into the top sheet of film sufficient to overcome an interface force between the top sheet of film and other sheets of film;
   wherein the cup plate is rotatable relative to the heel plate from a first, bend position to a second, cup down position and wherein the film tray includes a separation tab extending above the stack of film, and wherein imparting a bend includes:
      rotating the cup plate from the cup down position to the bend position such that the top sheet of film bends upwardly from the heel plate to the suction cup and downwardly from the suction cup to the separation tab.

25. The method of claim 24, wherein the top sheet of film includes a leading edge, and wherein bending the top sheet of film includes:
   positioning the suction cup and the heel plate in close proximity to the leading edge of the top sheet of film.

26. The method of claim of claim 24, wherein delivering the top sheet of film includes moving the cup plate in the bend position to the film transport system.

27. The method of claim 24, wherein imparting a bend includes imparting a compound bend in the top sheet of film.

28. The method of claim 27, wherein the separation tab includes a beveled portion transverse to a leading edge of the top sheet of film, and wherein imparting a compound bend further includes:
   bending the top sheet of film along the beveled portion of the separation tab.

29. The method of claim 24, wherein the cup plate is rotatable relative to the heel plate from a first, bend position to a second, cup down position and wherein securing the suction cup to the top sheet of film includes:
   rotating the cup plate from the bend position to the cup down position such that the suction cup contacts the top sheet of film; and
   creating a vacuum between the suction cup and the top sheet of film.

30. The method of claim 29, wherein a passive vacuum is created between the suction cup and the top sheet of film.

31. The method of claim 24, wherein the cup plate is rotatable relative to the heel plate from a first, bend position to a second, cup down position and wherein imparting a bend includes:
   rotating the cup plate from the cup down position to the bend position while the heel plate remains in contact with the top sheet of film.

32. The method of claim 31, wherein imparting a bend further includes sliding the top sheet of film relative to other sheets of film in the stack of film.

33. The method of claim 24, wherein delivering the top sheet of film includes:

moving the cup plate upward such that the top sheet of film is positioned within the film transport system; and releasing the top sheet of film from the suction cup.

34. The method of claim 33, wherein delivering the top sheet of film further includes:

raising the cup plate in a substantially vertical fashion such that a leading end of the top sheet of film clears the film transport system; and translating the cup plate in a substantially horizontal fashion such that the leading end of the top sheet of film enters the film transport system.

35. The method of claim 34, wherein the film transport system includes a pair of rollers configured to deliver the sheets of film to an exposure module, and wherein the leading end of the top sheet of film avoids contact with the pair of rollers when raising the cup plate in a substantially vertical fashion.

* * * * *